(12) United States Patent
Kikugawa et al.

(10) Patent No.: US 7,945,002 B2
(45) Date of Patent: *May 17, 2011

(54) INFORMATION READ DEVICE AND READ SIGNAL PROCESSING CIRCUIT

(75) Inventors: Atsushi Kikugawa, Tokyo (JP); Hiroyuki Minemura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 194 days.

This patent is subject to a terminal disclaimer.

(21) Appl. No.: 12/356,813

(22) Filed: Jan. 21, 2009

(65) Prior Publication Data

US 2009/0136219 A1     May 28, 2009

Related U.S. Application Data

(63) Continuation of application No. 11/236,801, filed on Sep. 28, 2005, now Pat. No. 7,483,478.

(30) Foreign Application Priority Data

Jun. 9, 2005 (JP) ................................. 2005-168979

(51) Int. Cl.
    *H04L 27/06* (2006.01)
(52) U.S. Cl. ....................................... 375/341
(58) Field of Classification Search ........................ None
    See application file for complete search history.

(56) References Cited

U.S. PATENT DOCUMENTS

| | | |
|---|---|---|
| 5,729,517 A | 3/1998 | Fujiwara |
| 5,809,071 A | 9/1998 | Kobayashi |
| 6,831,884 B2 | 12/2004 | Hamada |
| 6,922,384 B2 | 7/2005 | Miyashita |
| 7,239,682 B2 | 7/2007 | Liu |
| 7,315,591 B2 | 1/2008 | Daishin |
| 7,370,266 B2 | 5/2008 | Yamakawa |
| 2002/0129319 A1 | 9/2002 | Fujiwara |
| 2004/0257953 A1 | 12/2004 | Kuribayashi |
| 2005/0063276 A1 | 3/2005 | Ogura |

FOREIGN PATENT DOCUMENTS

| | | |
|---|---|---|
| JP | 07-302467 | 11/1995 |
| JP | 09-82025 | 3/1997 |
| JP | 11-296987 | 10/1999 |
| JP | 11-328874 | 11/1999 |
| JP | 2002-298514 | 10/2002 |
| JP | 2005-141868 | 6/2005 |

*Primary Examiner* — Khanh C Tran

(74) *Attorney, Agent, or Firm* — Antonelli, Terry, Stout & Kraus, LLP.

(57) ABSTRACT

An information read device enabling obtaining of a data pattern recorded on an information recording medium as a readout signal, includes an analog to digital converter for converting the readout signal to a digital signal for a predetermined clock, a phase locked loop circuit that supplies the clock used in the analog to digital converter, a first FIR filter for equalizing the digital-converted digital signal under a first equalization condition, a Viterbi decoder to decode outputs of the FIR filter into binary data, wherein the phase locked loop circuit enables detection of a cycle slip of the phase locked loop circuit, and a detector which detects the cycle slip of the phase locked loop circuit. The FIR filter returns tap coefficients of the FIR filter, and the Vitabi decoder returns a target level of a decode operation to an initial value when an outbreaking of the cycle slip occurs.

2 Claims, 25 Drawing Sheets

SIGN : DISABLE SIGNAL FOR ADJOINING SIGN METHOD. STOP WITH A TRUE.

LEVEL : DISABLE SIGNAL FOR AMPLITUDE METHOD. STOP WITH A TRUE.

THRESHOLD VALUE FOR 2T DETECTION (POSITIVE)
$V_{thp}$: 2T DETECTION THRESHOLD (POSITIVE)
$V_{thn}$: 2T DETECTION THRESHOLD (NEGATIVE)

INFORMATION READ DEVICE AND READ SIGNAL PROCESSING CIRCUIT

CROSS REFERENCE TO RELATED APPLICATION

This application is a continuation of U.S. application Ser. No. 11/236,801, filed Sep. 28, 2005, now U.S. Pat. No. 7,483,478, the contents of which are incorporated herein by reference.

CLAIM OF PRIORITY

The present application claims priority from Japanese application JP 2005-168979 filed on Jun. 9, 2005, the content of which is hereby incorporated by reference into this application.

FIELD OF THE INVENTION

The present invention relates to an information read device for reading information written on a recording medium, as well as a read signal processing circuit for processing read signals.

BACKGROUND OF THE INVENTION

In recent years, the PRML (partial response most-likelihood) method is utilized in systems for processing read signals in optical disk drives such as for DVD (digital versatile disc). This read method is already widely used in the communications field and information recording devices such as magnetic tape units and hard disk drives and so is a convenient method for achieving low bit error rates even under conditions where there is strong inter-symbol interference. Therefore this PRML method is particularly effective for boosting the linear recording density.

The discussion for the present invention is mainly focused on signals whose minimum run length is 2 T, which is utilized in the Blu-ray disc; unless specified otherwise, the minimum run length is assumed as 2 T. A signal subjected to AD (analog-to-digital) signal conversion is mainly used. Therefore, from hereon unless specified otherwise, a signal referred to simply as a read signal indicates AD converted data. However, when not clearly indicated in the text, the read signal need not always be AD converted data.

The typical structure of a read circuit for an optical disk using PRML signal processing is shown in FIG. 2. This type of circuit is disclosed for example in JP-A No. 298514/2002. In this figure, the read signal acquired from the optical head is converted to a digital data stream by the AD converter 21, after being subjected AGC (automatic gain control) equalization, and elimination of DC components by an analog signal processor 10. A slicer 22 minimizes the DC components occurring due to pattern dependence. Next, after equalization performed as needed by a FIR (finite impulse response) equalizer 23, the signal is input to the Viterbi decoder 40 and is here binarized. The PRML signal processing system operates using a clock signal synchronized to the read signal clock as its reference, and therefore uses a PLL (phase-locked loop) to synchronize the signal processing system clock to the phase of the read signal. As shown in FIG. 2, a digital-PLL utilizing a phase detector 31 with the digital method, is generally utilized when inputting the signal to the PLL after conversion in the ADC (analog-to-digital converter). In the example in FIG. 2, a PLL 30 includes a phase detector 31, a loop filter 33, and a VCO (voltage controlled oscillator) 34. The phase detector 31 compares the input signal with the phase of the clock 52 generated by the VCO 34, and generates a phase error.

SUMMARY OF THE INVENTION

The read clock must synchronize with the read signal clock with adequate accuracy in order to obtain a satisfactory effect from the Viterbi decoder in the PRML signal processing system. However, the phase detector used in a PLL is affected by noise in the input signal. So the problem then occurs that when the input signal SNR (signal-to-noise ratio) of the PLL phase detector drops, the frequency fluctuation in the read clock becomes larger, so that the error rate increases. When the input signal contains components with drastically low resolution, the effects of fluctuations in noise and (DC) direct current components are compounded and cause the problems of poor phase error detection accuracy or mistakenly detecting the pulse edge.

In order to resolve the above problems, the present invention contains a selector for selecting an output from the adaptive type equalizer (FIR EQ, Adaptive EQ) for equalizing the AD converted digital signals, and an output from a short FIR equalizer (for example, a limit equalizer) for equalizing the AD converted digital signal and; inputting that output to the phase detector in the PLL circuit. Under normal operating conditions, the low-pass filter characteristics of the FIR equalizer act to suppress noise in the high-frequency region and therefore improve the SNR (signal-to-noise ratio) of the signal input to the phase detector. However, the loop delay of the PLL circuit then increases. The short FIR equalizer on the other hand renders no noise suppression effect, yet if the short FIR equalizer contains a limit equalizer, then it can greatly amplify only the 2 T length signal even if there are only a small number of taps, so the short FIR equalizer can improve the jitter in the signal input to the phase detector.

This optical disk signal processing system achieves a low error rate even when the SNR (signal-to-noise ratio) of the input signal is low, and avoids pulse edges with low phase detection accuracy or signal pulse strings with a high possibility of being mistakenly detected as an edge in conventional methods, and also supports diverse types of input signals.

DETAILED DESCRIPTION OF THE PREFERRED EMBODIMENTS

The embodiments of the present invention are hereafter described in detail.

First Embodiment

Figure 1:
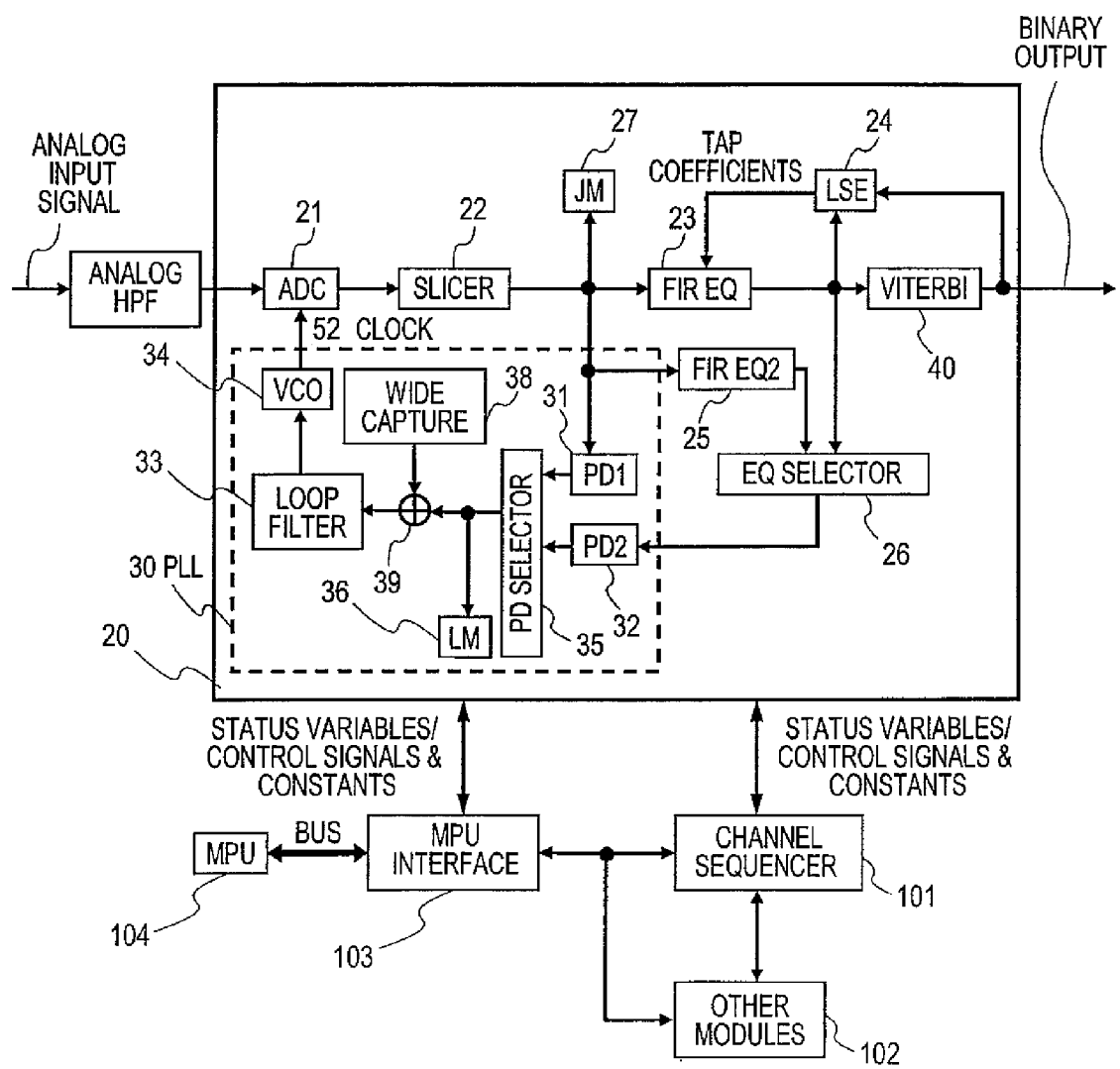
FIG. 1 is a figure showing the structure of the read system.
Figure 2:
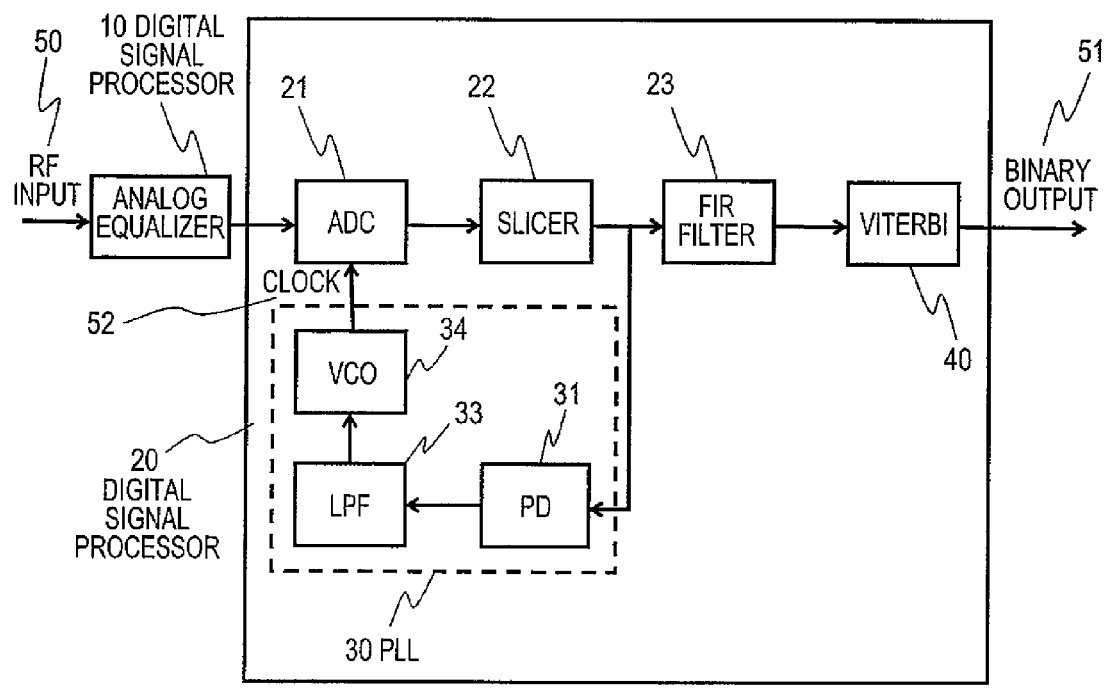
FIG. 2 is a figure showing the structure of the PRML read system.

FIG. 1 is a drawing showing the structure of the decoder circuit for the read signals of the present invention. After AGC and equalization processing by the analog equalizer, the RF signal detected by the optical head not shown in the drawing is input to a digital signal processor 20. After the input RF signals are changed to digital signal per each clock by the AD converter 21, these signals are DC compensated in a slicer 22, digitally processed in the FIR equalizer 23, binarized by a Viterbi decoder 40, and extracted as a binarized output 51. The Viterbi decoder 40 compares the read signal with the target signal generated from the convolution of the PR class and the bit stream, and selects and binarizes a bit stream with a minimal error (difference). The LSE (least square error) controller 24 implements processing for adapting to the tap coefficient of the FIR equalizer described above. The PLL (Phase Locked Loop) circuit 30 that generates a clock signal 52 includes a two phase detectors made up of a phase detector A and a phase detector B (respectively 31, 32), a feedback path selector 35, a loop filter 33, and a VCO (Voltage Controlled Oscillator) 34, and a lock monitor 36.

A characteristic of this structure is that the equalizer selector 26 selects two signals after processing in the AD converter 21 and after processing in the FIR equalizer 23 or a short FIR equalizer 25, and the feedback path selector 35 selects and uses one of the signals from the respective phase detector A or phase detector B. The reason is described next.

The FIR equalizer 23 is capable of improving the quality of the read signal. After AD conversion, the response delay up to control by the VCO34 is set as t1, based on phase results detected in the phase detector 31. After AD conversion and equalization by the FIR equalizer 23, the phase error is detected by the phase detector 32 from the read signal, and the response delay up to controlling the VCO and use in the clock signal 52 is set as t2. As clearly shown by the structure in FIG. 1, the t2 is larger than t1 so that in cases where the PLL loop response speed is critical such as during clock pull-in, there is a high probability that pull-in errors will occur when the phase detector B is used. A characteristic of the present invention is that a feedback path selector allows switching to select the phase detector A as the shortest path, to control the VCO when the response speed is critical, and switching to the phase detector B for stability such as attaining a steady state when stability is critical after pull-in. A selector 35 (feedback path selector 35) is installed to perform this switching. The channel sequencer 101 switches between the feedback path selector and the equalizer selector by a predetermined procedure according to the state of the other module 102 (RMS value for phase error monitored by the lock monitor 36) inside the LSI and the read system, and changes each type of constant. The MPU (micro processing unit) 104 implements software to control the drives. Instructions from that MPU are conveyed to the read signal processing system via an MPU interface 103, to switch between the feedback path selector and the equalizer selector, and change each type of constant. The FIR equalizer can adaptively equalize the target waveform with the Viterbi decoding results by enabling the adaptive equalizing devices.

Another characteristic of this structure is that a desired equalizer to insert into the PLL loop can be selected from among multiple types of equalizers by using the equalizer selector 26 according to properties such as the SNR and resolution of the signal input to the system. It conditions are normal, high frequency noise components can be suppressed, and the SNR of the signal input to the phase detector can be improved due to the low-pass filter characteristics of the FIR type equalizer. However, the PLL loop delay then becomes larger. On the other hand, if, for example, a limit equalizer is used in the short FIR equalizer because no noise reduction effect is likely from the short FIR equalizer 25, then the jitter in the signal input to the phase detector can be improved by amplifying just the 2 T signal strength (amplitude) even if there are only a small number of taps.

If there is a large differential between the data clock frequency and the oscillating frequency of the VCO in the initial period of the PLL lock process, then the pull-in cannot be achieved by the PLL alone, or even if pull-in is possible, that time is predicted to be extremely long. Under those circumstances, the wide-capture manager 38 can alleviate the above problem by applying a voltage to the VCO via the adder 39 to reduce the frequency differential (between the data clock and VCO). For example, when the respective number of clock cycles of a harmonic (multiplied) signal obtained by multiplying the wobble signal 69 times (in case of BD-RE) and the VCO output signal are measured in a fixed period frequency counter, and the VCO frequency is low, then a control voltage can be added to the phase detector output to increase the VCO oscillating frequency; or lower it if the oscillating frequency is high.

Second Embodiment

Various sequences (procedures) are defined in the channel sequencer. These sequences are executed when there is a request from the MPU based on firmware instructions or by taking advantage of different types of interrupt requests issued by a mechanism monitoring state variables of different types held internally in the channel sequencer. These sequences are defined in the following embodiments. A priority level is assigned to each interrupt, and for example, when an interrupt with a high level of priority has been issued during processing for a low priority interrupt, then the on-going processing is halted and the processing for the high priority interrupt is performed first. The priority level for the interrupt can be changed as needed.

Figure 5:
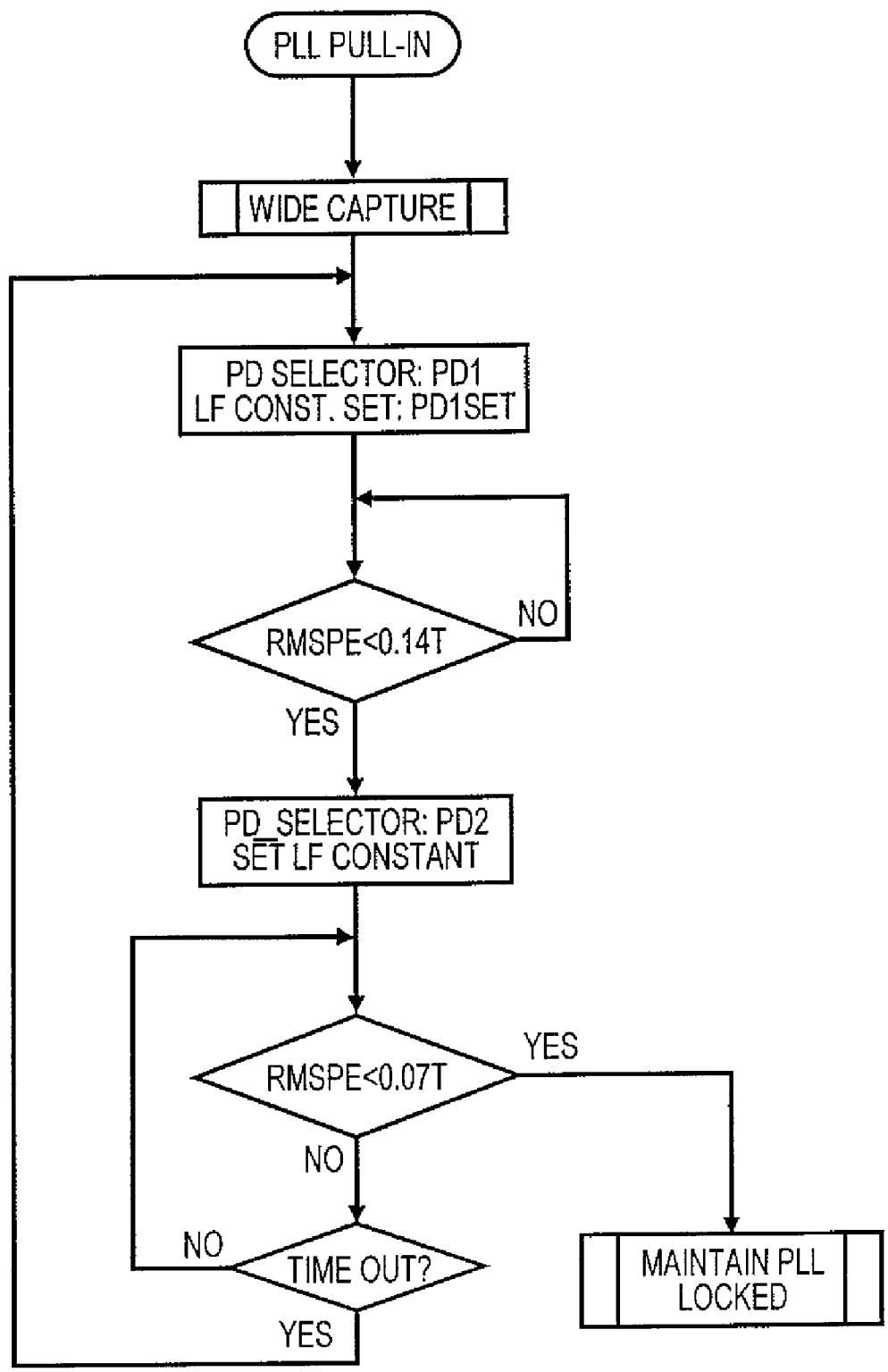
FIG. 5 is a flowchart of the PLL pull-in sequence.

During phase detection utilizing the output of the FIR equalizer or the short FIR equalizer 25, the procedure shown in FIG. 5 is for a mode utilized exclusively when the quality of the read signal that was input is within the range specified by the Blu-ray disc standard. Wide capture makes the oscillating frequency of the VCO nearly match the lock frequency of the read signal by observing the periods of the sync marks or the wobble frequency. The wide capture sequence is executed the same as other sequences, when the variables of the object for observation fulfill the conditions, or in other words, when there is a differential of one percent or more between the VCO output frequency and a wobble signal frequency increased 69 times. Stated in other words, wide capture is judged to have occurred when the differential between the two frequencies is within one percent. This value was established in view of the PLL frequency pull-in performance when utilizing the phase detector A in the system shown in FIG. 1.

Next, when wide capture is completed, the process shifts to PLL operation using the output of phase detector A. The value of the VCO control voltage at the completion of the wide capture is used as the initial VCO control voltage. At this time, the loop filter constants are set to suitable values for using the phase detector A. Pull-in with PLL can be accomplished at this time if there is a signal for the quality assumed here. The phase lock state is essentially appropriate to determine by the size of the RMS (route mean square) value of the phase error (difference) found from the phase detector output. However, in circuits for determining the RMS value in digital signal processing systems, it is difficult to consecutively determine the RMS value by using the clock frequency due to factors such as the circuit scale and electrical power consumption. A value called RMSPE (root mean squared phase error) averaged from the absolute value of the phase error is therefore used here instead (of the RMS value). When this RMSPE value falls below a reference value within a preset period, the PLL utilizing the phase detector A is judged to be in a lock state. This prevents faulty operation (triggering) from being judged to be in a lock state with an instantaneous value due to the RMSPE accidentally being a small RMSPE value for a short time even when not in a lock state. After determining that the loop using phase detector A is in a lock state, the feedback path selector switches to the phase detector B side, and the equalizer selector switches to the short FIR equalizer side. The loop filter constants are at the same time also switched to values suitable for using the short FIR equalizer and the phase detector B. This switching is performed in order to cope with loop gain fluctuations and increased loop delays by short FIR equalizer insertion and switching the tri-time type phase detector. After the above switching, the RMSPE value is monitored and, if equal to or less than the reference value (in this case, 0.07 T) within a fixed amount of time, then the process transitions to a mode for maintaining the lock state described in the next embodiment. However, if the RMSPE value does not fall below the reference value (in this case, 0.07 T), then a time-out is judged to have occurred, and the operation returns to the pull-in process using the phase detector A. If the RMSPE does not become a sufficiently small value in the mode using phase detector B, it is probably because the SNR of the input signal is extremely poor, or there are large variations in the frequency or phase. In any case, continuing to use a mode with phase detector B having a large loop delay may cause an unstable PLL or even pull-out. In order to avoid this, the operation shifts once again to the mode using phase detector A possessing high stability and a wide capture range.

Whatever mode the PLL is in, the wide capture block continues to operate in parallel with the output to the VCO still stopped. When a frequency difference exceeding one percent is detected, the PLL lock state is considered to be completely canceled, and the sequence of FIG. 5 is re-performed from the start.

The same PLL control sequence is utilized when using the FIR equalizer output for phase detection instead of the short FIR equalizer. Needless to say, however, each loop filter coefficient utilizing the phase detector B will differ from the coefficients when using the short FIR equalizer. If the signal quality is within the range established for Blu-ray disc standards then there is no need for adaptive equalization so that a low error rate can be expected if pre-established constants are used as the FIR equalizer tap coefficients. Of course the tap coefficients for the FIR equalizer and the loop filter coefficients will vary according to the type of medium and the recording density. The same procedure may be used even if using the FIR equalizer as the adaptive equalizer.

Third Embodiment

Maintaining the PLL Lock

Figure 6:
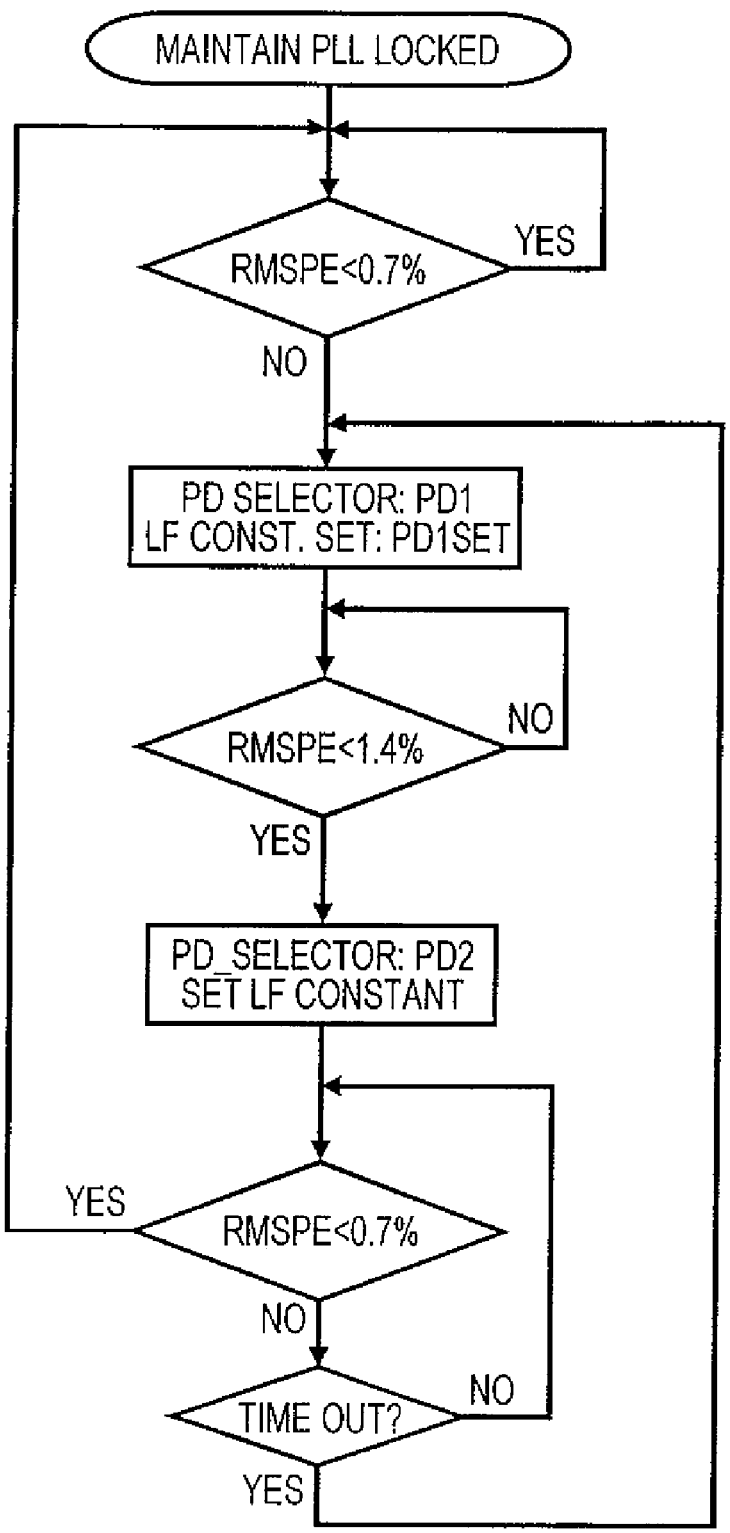
FIG. 6 is a flowchart showing the sequence for maintaining the PLL lock.

A sequence for monitoring the state after completion of PLL pull-in and maintaining the lock is shown in FIG. 6. This sequence is executed if the PLL is unlocked so the channel sequencer must monitor the output of the lock monitor. The process for monitoring the lock monitor output is actually performed by the channel sequencer as previously described, and the expressions contained in this sequence are shown in FIG. 6. These type of expressions are for the purpose of clarifying that the observation variables for the sequence are the lock monitor. These same expressions are used even in flowcharts in other embodiments from hereon for describing the sequence.

When the PLL pull-in sequence is complete (PLL is in locked state), the PLL shifts to a mode to maintain the lock state. In other words, the sequence shown in FIG. 6 for the pull-in mode that was disabled in pull-in mode is now enabled. As shown in FIG. 6, the lock monitor output is monitored, and if its output is below the reference value (in this case, 0.07 T) then the operating mode is maintained with no changes. On the other hand, if the RMSPE has continually exceeded the reference value for a certain period, then the process switches to the mode utilizing phase detector A. This switching is performed because the loop delay remains large when a large phase error (differential) has temporarily occurred due to external disturbances such as tiny defects and time is needed for recovery. When the loop using phase detector A has pulled into the preliminary lock state (or when the preliminary lock state was confirmed), the process switches to the loop using phase detector B. In this case, the description for switch the loop filter constants as needed is the same as related previously. Monitor the RMSPE value and if the value (lock state) is lower than the reference value (in this case, 0.07 T) within a specified time then the process returns to monitoring the output of the lock monitor. However, if it has not fallen below the reference value (in this case, 0.07 T) within a specified amount of time, then a time-out is judged to have occurred, and the pull-in process is once again repeated using the phase detector A. If the RMSPE does not become a sufficiently small value in the mode using phase detector B, it is probably because the SNR of the input signal is extremely poor, or there are large variations in the frequency or phase. In any case, continuing to use a mode with phase detector B having a large loop delay may cause an unstable PLL lock or even pull-out. In order to avoid this, the process shifts once again to the mode using phase detector A possessing high stability and a wide capture range within a specified amount of time.

Fourth Embodiment

Monitoring the Number of Error Corrections

The quality of the signal that was input can be roughly evaluated by a jitter measurement device, so if the signal quality is determined to be within the range established for Blu-ray disc standards then a sufficiently low error rate can be expected in the modes of the second and third embodiments. However, cases that the error rate is greater than expected, although the jitter is sufficiently small, may occur. Case like this can be detected by monitoring the number of error corrections.

One cause for the error rate being high even though the statistically acquired signal quality is good, is that there are localized regions with low signal quality. One physical cause is assumed to be the oily film that remains after fingerprints are wiped away. When this type of oily film is present for example to 10 microns, then in the case of a Blu-ray disc the error rate may deteriorate by one or two figures. The adherence of an oily film may cause spherical aberrations and other problems. However if the thickness is within a range the FIR equalizer can handle, then that effect can be canceled out.

Figure 7:
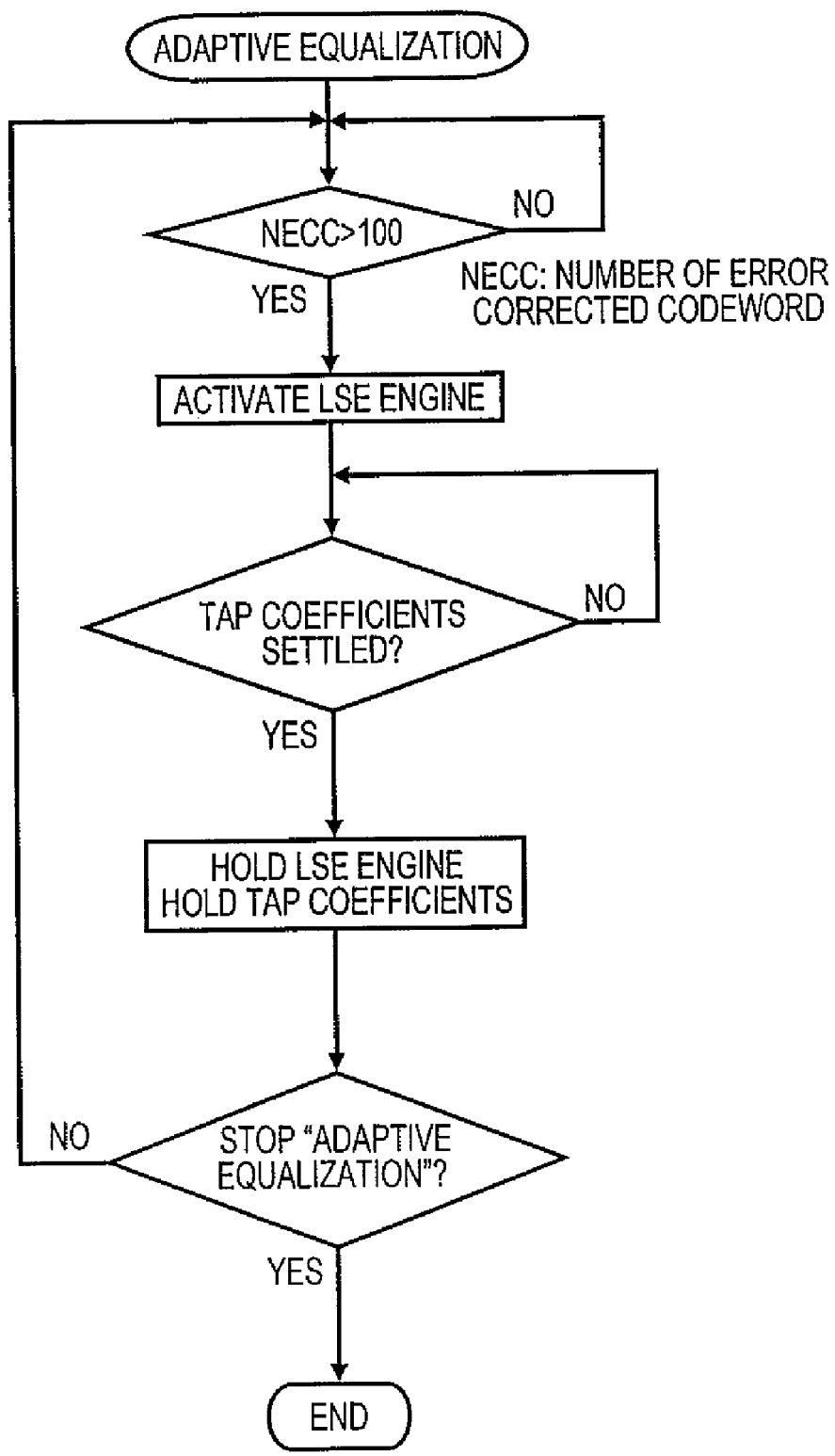
FIG. 7 is a flowchart showing the sequence for dealing with localized contamination in the adaptive equalization.

The sequence for dealing with this case is shown in FIG. 7. First of all, the number of code words subjected to error correction from among the results of the error correction procedure is monitored, and if there are consecutive clusters exceeding a preset figure, or if these clusters appear at more than a specified frequency, then the status can be determined to be the above described case. In that case, the adaptive equalizing controller starts and adaptive equalization with the FIR equalizer begins. The number of overall error corrections diminishes because the adaptive equalization compensates the signal deterioration occurring in localized sections. Under these circumstances, the change in FIR equalizer tap coefficients is monitored, and when decided that sufficient tap coefficients are set, the FIR tap coefficient is fixed at the value at that time, and adaptive equalization is stopped. Adaptive equalization can in this way be automatically stopped while continuing to read, when the cause of signal deterioration has deviated from its diameter. This is desirable because stopping adaptive equalization when there is an unexpected and sudden change in signal quality may to the contrary cause worse results. The last values for the FIR equalizer tap coefficient after stopping adaptive equalization are retained because a change in signal quality might occur from the read radius. The process then usually returns to monitoring the number of code words that were error corrected. However, this monitoring is terminated when an external instruction to stop adaptive equalization sequence is issued.

This sequence is mainly intended to deal with cases such as dirt or grime on localized sections of the disk. However, enabling this sequence also allows dealing with factors causing a slow fluctuation (distribution of cover layer thickness along the radius) or variations in the recording state of the clusters.

Fifth Embodiment

Adaptive Viterbi Decoder

One issue to be confronted in processing the optical disk read signal with the PRML method is to deal with asymmetry. In primitive PRML processing systems, it is assumed that there is no asymmetry in the input signal. Therefore, the target signal synthesized based on the specified PR class possesses no asymmetry so in some cases the equalization differential cannot be made small enough, even if adaptive equalization was performed using an FIR equalizer. In the case of Blu-ray discs, the shorter the mark or space signal is, the greater the frequency of appearance becomes so the remaining equalization error becomes larger, as the mark or space signal becomes longer. Here, the method for dealing with asymmetry utilizes an adaptive Viterbi decoder to adapt the target value to the input signal (A Viterbi decoder of this type is disclosed in JP-A No. 296987/1999).

Figure 8:
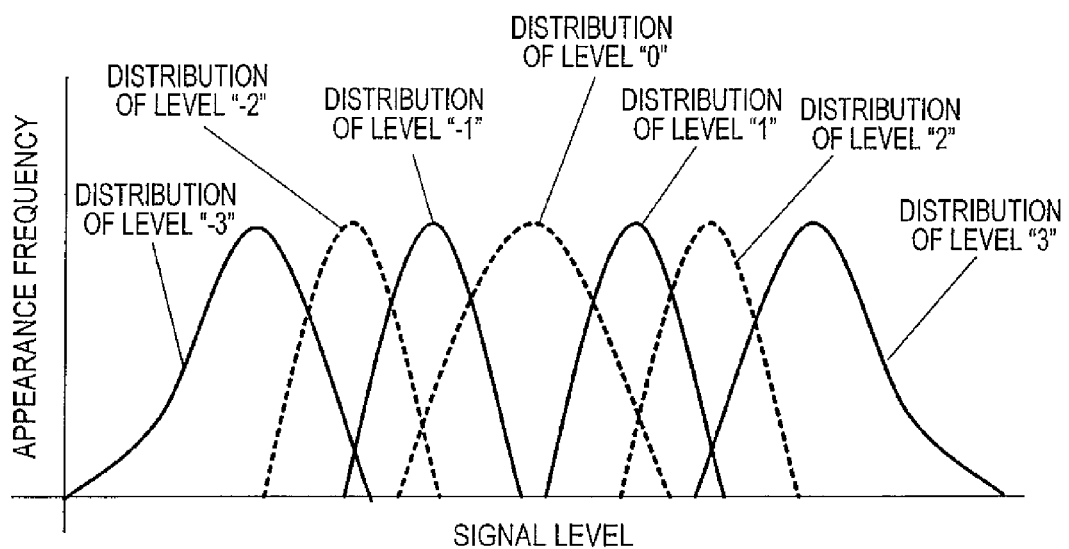
FIG. 8 is a graph showing the level distribution.

FIG. 8 is a graph showing the distribution for each target level as results for a Viterbi signal adapted for PR (1,2,2,1). The horizontal axis in the figure is the input signal level and the vertical axis is the frequency of occurrence. The average values for input signal levels corresponding to bit streams (0,0,0,0), (1,1,1,1) for each target level are respectively denoted as A0000, A1111. The average value of the input signal corresponding to the target level 0 (eye-center) is A0011 (A0011 and A1100 are actually degenerated). Also, A1111 and A0000 correspond to the target levels 3 and −3. These values reflect the characteristics of the input signal and when there is no asymmetry, A0011 is in the exact center of A0000 and A1111. In contrast however, when there is asymmetry then there is a deviation from the center according to the extent of that asymmetry. That asymmetry is detected utilizing those characteristics, and if necessary the target level adjusted so that read performance can be improved. That method is described next.

Figure 9:
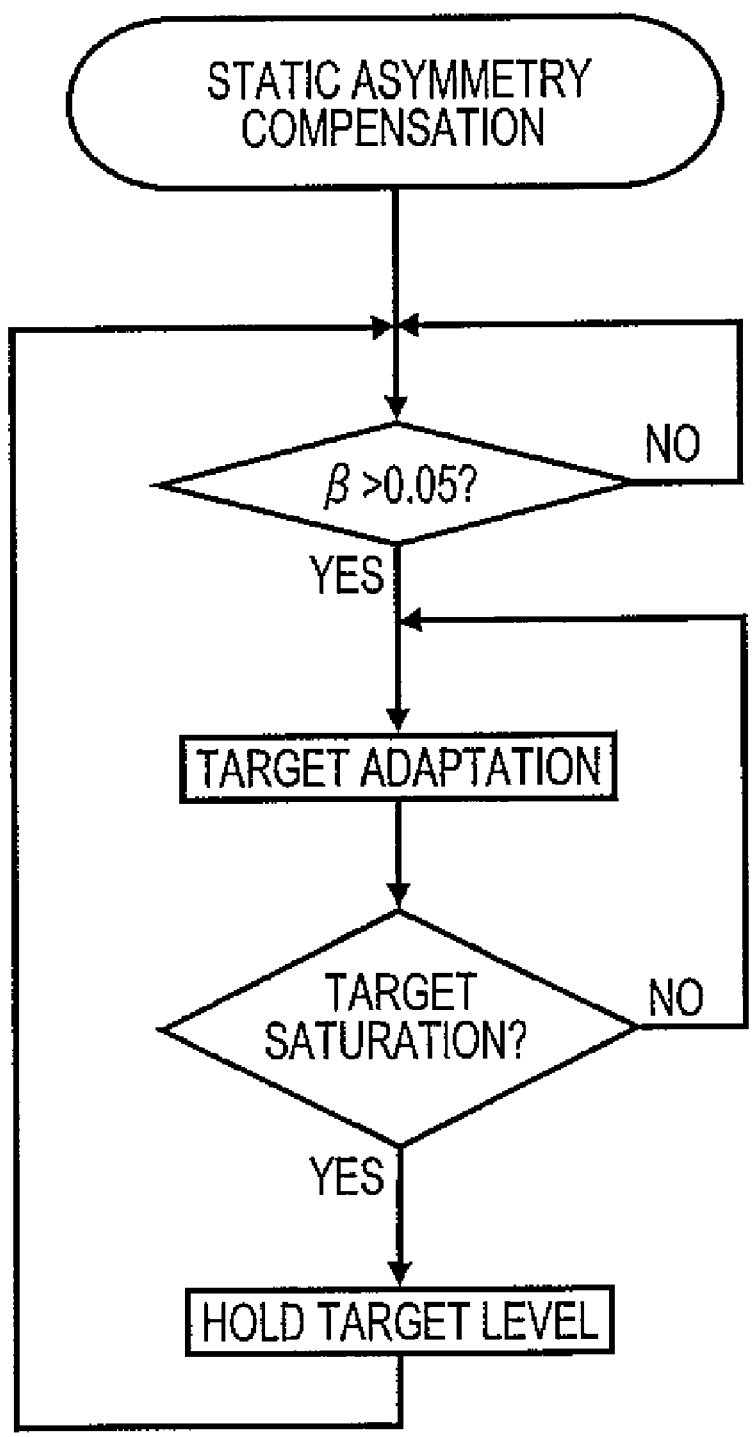
FIG. 9 is a flowchart showing the sequence for dealing with asymmetry.

First, the processing method when just the asymmetry is large is described. The processing sequence is shown in FIG. 9. First of all, the extent of the asymmetry is investigated in the following method. The target of the Viterbi decoder is set to the standard PR class for Blu-ray discs (for example PR (1,2,2,1), and Viterbi decoding performed. Only the updating (rewriting) of the target is not performed at this time. In other words, there is no target adaptation but average values for the input signal levels can be obtained that correspond to the target levels and these values can be used to determine the extent of the asymmetry. The average value for input signal levels corresponding to the bit streams (0,0,0,0) (1,1,1,1) obtained as shown above are here denoted as A0000, A11111. Also, the 0 level value corresponding to the center of the eye pattern is A0011 (Actually, A0011, A1100 are degenerated.) At this time, the β defined in (Formula 3) is a marker for asymmetry.

$$\beta = \frac{1}{2} - \frac{A0011}{A1111 - A0000} \qquad \text{[Formula 1]}$$

When the absolute value for β exceeds the preset value (standard value 0.05) then the asymmetry is large and correction of the target level is judged necessary.

When the asymmetry is judged to be large, then the target level is adapted to the input signal. The change in target values is monitored during this time, and if determined to be saturated then the values are held at that point, and the process again returns to the stage for evaluating the asymmetry.

In the most primitive adaptive Viterbi decoders, all targets are essentially individually adjusted to match the input signal level. However, when coping only with asymmetry, the adaptive Viterbi decoder utilized here can be controlled to limit to the same value, those target levels with mutually inverted bit streams along the time axis.

Sixth Embodiment

The case, when using both adaptive equalization and dealing with asymmetry is required, is described next. This sequence is applied when the jitter is larger than the standard value. Adaptive equalization is considered effective in dealing with white noise and low resolution which are among the main causes of increased jitter. The frequency characteristics of the FIR equalizer in the state for implementing equalization act to boost frequency components possessing insufficient amplitude (mainly 2 T signals), while suppressing unnecessary high-frequency components.

Figure 10:
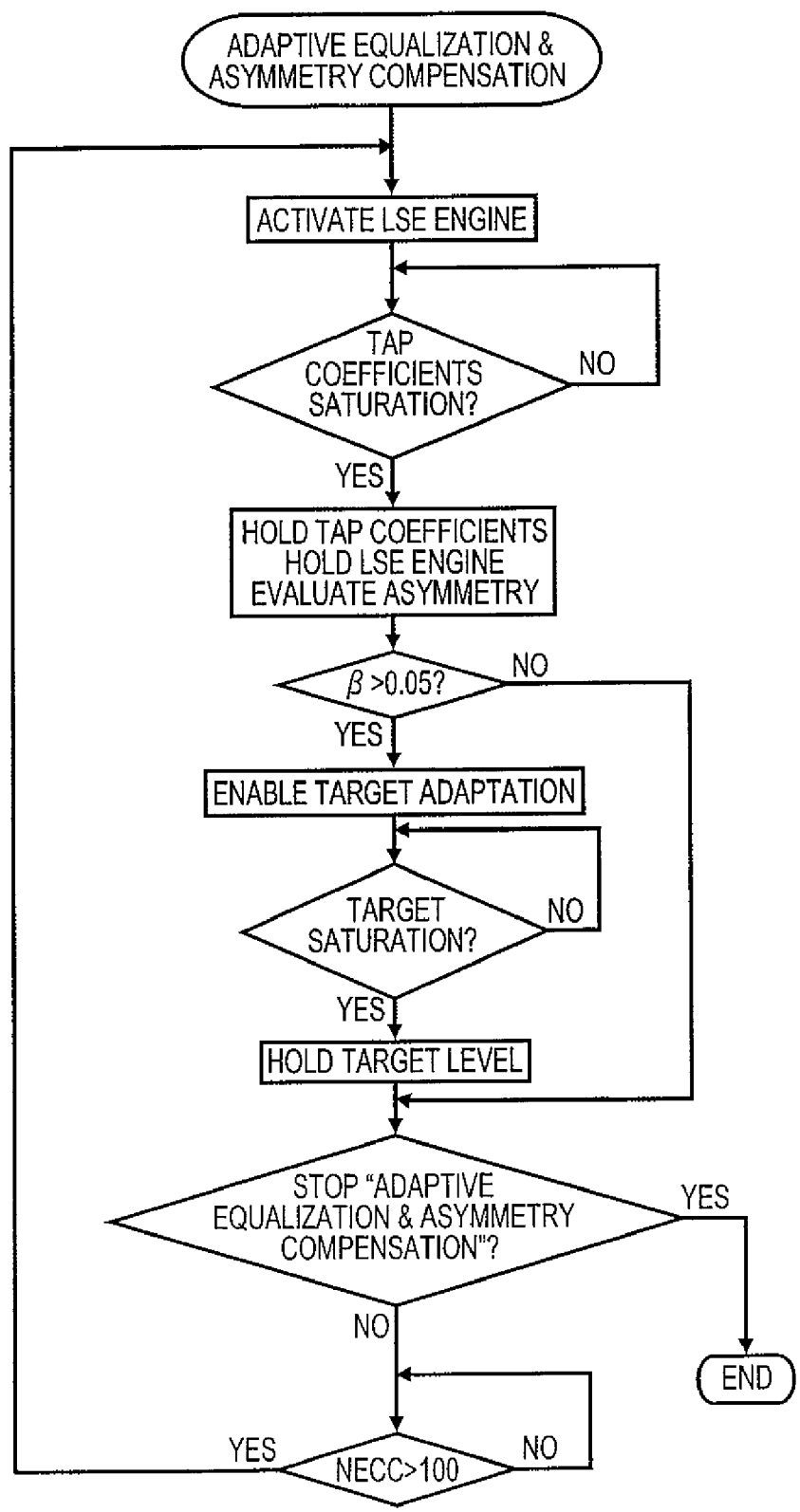
FIG. 10 is a flowchart showing the sequence for performing adaptive equalization and dealing with asymmetry.

This sequence is shown in FIG. 10. An LSE (least square error) engine is first activated as described previously and equalization performed. Information on the asymmetry still has not been obtained at this time so the target for the Viterbi decoder is set in a state where values for example corresponding to PR (1,2,2,1) are set as the initial values. During this time, the tap coefficients for the FIR equalizer are monitored, and the process awaits the setting of the coefficient. After the tap coefficient has been set, the asymmetry marker $\beta$ is measured in the same way as the fifth embodiment. When the $\beta$ is here larger than the reference value, the target value is adapted to the input signal the same way as in the fifth embodiment, and when the target values are set, those target values are then held. At this point, the adjustment of the resolution and the asymmetry countermeasures are already completed, and the read performance is significantly improved compared with the initial state. Therefore terminating the adjustment of the FIR equalizer and the target at that time is sufficient in most cases. However, the FIR equalizer tap coefficient is learned in a state that does not consider the asymmetry so that the target waveform synthesized by LSE engine does not possess asymmetry, allowing a surplus to remain for making the equalization error even smaller. By therefore selecting a sub-mode, the tap coefficient of the FIR equalizer is here once again learned, so that an even smaller equalization error (difference) can be set.

After the above operation, the sequence ends here if an instruction to end the processing has been previously issued. If no such instruction was issued then the process shifts to the NECC (number of error correction in a cluster) observation state. The NECC moving average for each cluster is rated, and compared with the NECC right after adjustment was completed and if the increase is 50 percent or higher, or if that number exceeds 100 then the above procedure is repeated from the beginning.

Seventh Embodiment

Link

In RW (rewritable) media for Blu-ray discs, there are times when the adjacent clusters are consecutively recorded, and there are times when they are not. In the latter case, the frequency and the clock phase read from the read signal are normally not consecutive in the connecting sections (links) between adjacent clusters. Therefore, it is possible that links may contain extremely large phase errors, and the operating state of the read system may possibly exert adverse effects on the operation of the PLL, the adaptive equalizers, and adaptive Viterbi decoders. In R (write once) media, the read clock phase and the frequency may be non-consecutive in the same way, in links between consecutive non-recorded clusters. Some links may contain overlapping written sections, and normal phase detection from signals read out from those sections is impossible. Therefore links for -R media may also contain an extremely large phase error. These facts signify that special measures must be taken in the read systems and particularly the PLL operation in links for -RW as well as -R media.

The timing that the link appears can be predicted by monitoring the data address read from the data system or the address in pre-groove (ADIP) address read from the wobble signal. If the link appearance has been predicted, stable read system operation can be achieved by placing read system operation temporarily on hold.

Figure 11:
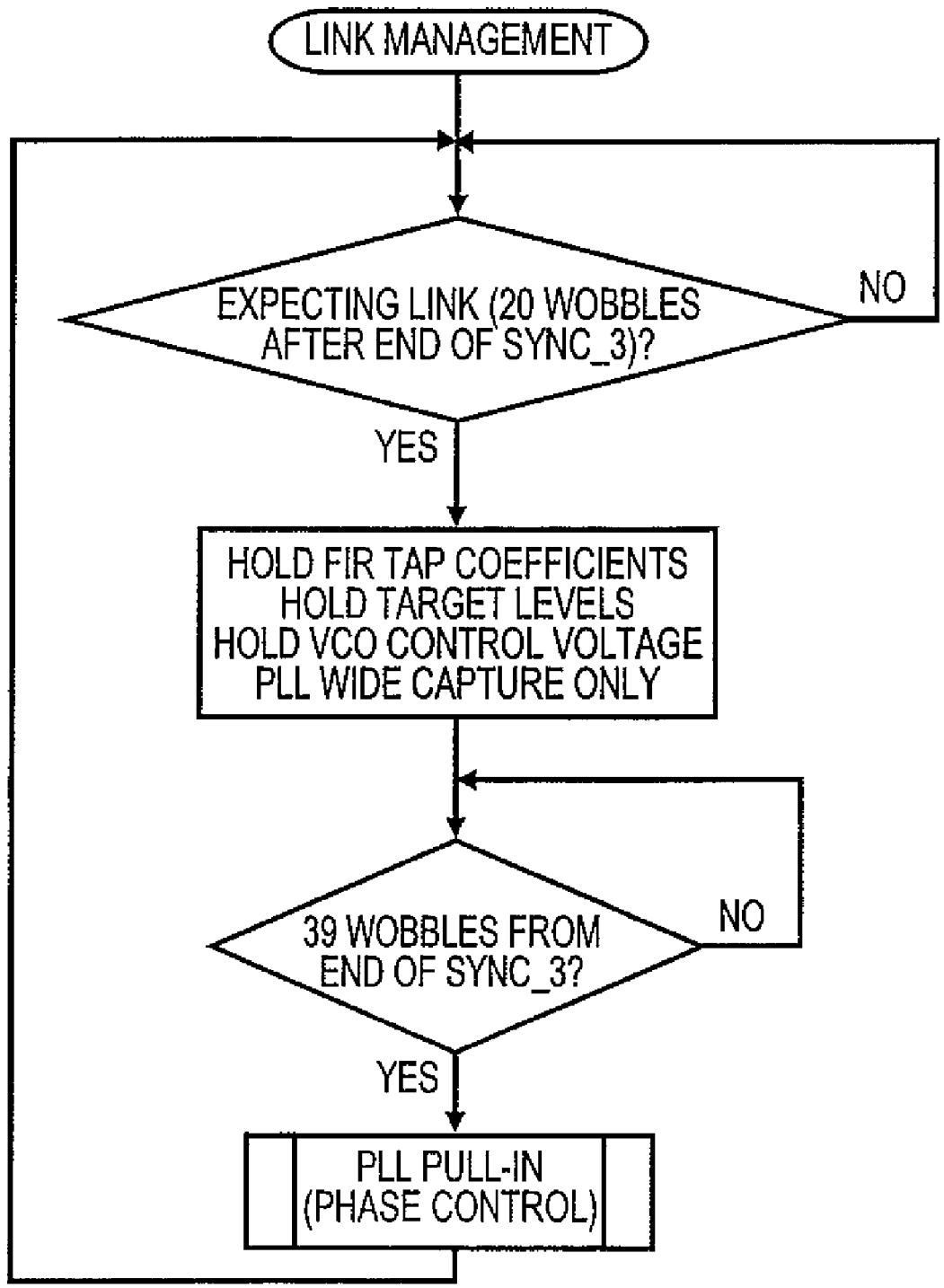
FIG. 11 is a flowchart showing the link management sequence.

The operating procedure for the read system per the link is shown in FIG. 11. In this sequence, the RW or the R media are always enabled unless voluntarily disabled during read. The link appearance can be predicted by monitoring the data address read from the data system or the ADIP address read from the wobble signal as described above. The link position in the RW medium is not fixed, and varies as much as ±2.3 wobble wavelength versus the nominal start position from the SPS (start position shift). The recording sequence is not limited to where the larger addresses are located to the rear. Therefore, the start timing of each type of processing that accompanies each link is also determined after taking this into account. The case when utilizing read results from the wobble signal is described next.

The record start position for the next cluster in nominal is 25.5 wobbles after the end of the sync_3 unit wobble for the cluster being read. Therefore the following processing is performed from 20 to 39 wobbles after the end of the sync_3 unit corresponding to the cluster being read, in view of non-confirmed items and recording position control accuracy. In other words, the hold for the VCO control voltage, the hold for the FIR equalizer tap coefficient, the hold for the target level of the Viterbi decoder, and the cut-off frequency for the high-pass filter are values set beforehand for the link. Hold instructions for the parameters issued here are issued separately from hold instructions specified individually such as with a register. In other words, learning is suppressed if immediately prior learning is in progress, and learning automatically restarts after this (hold instruction) is canceled. However if there is no learning prior the hold instruction, then learning is not performed even after this hold instruction is canceled. A precondition for the PLL of course is that the lock is released so that pull-in operation (process described in the second embodiment and the third embodiment) is first performed regardless of the immediately prior to operating state. Namely, only the wide capture is enabled until 39 wobbles have elapsed, and by placing the VCO control voltage on hold, a shift to phase control can be prevented. After 39 wobbles have elapsed, the link passage is assured so that pull-in with the PLL in the sequence described in the second and third embodiments is performed. When the PLL lock monitor shows a lock state, the target level hold instruction for the Viterbi decoder and the FIR tap coefficient is canceled. The constant for controlling the hold timing to match states such as high-speed read can be changed.

Eighth Embodiment

Maintaining a Steady State and Return (Handling Defects)

The optical disk medium is a changeable medium and the substrate is made of resin so it must be assumed to have recording film defects, scratches and dust/fingerprints adhering to it, etc. These problems can bring about non-consecutive DC components, phases and amplitudes in the read signal, the same as occurred in the link. However, unlike the link, it is impossible to know the appearance position beforehand, so abnormalities in the signals must be detected by some method, and processing then performed as a countermeasure. In the following description, localized errors in the read signal are broadly referred to here as defects without trying to label the specific cause unless specified otherwise.

Figure 12:
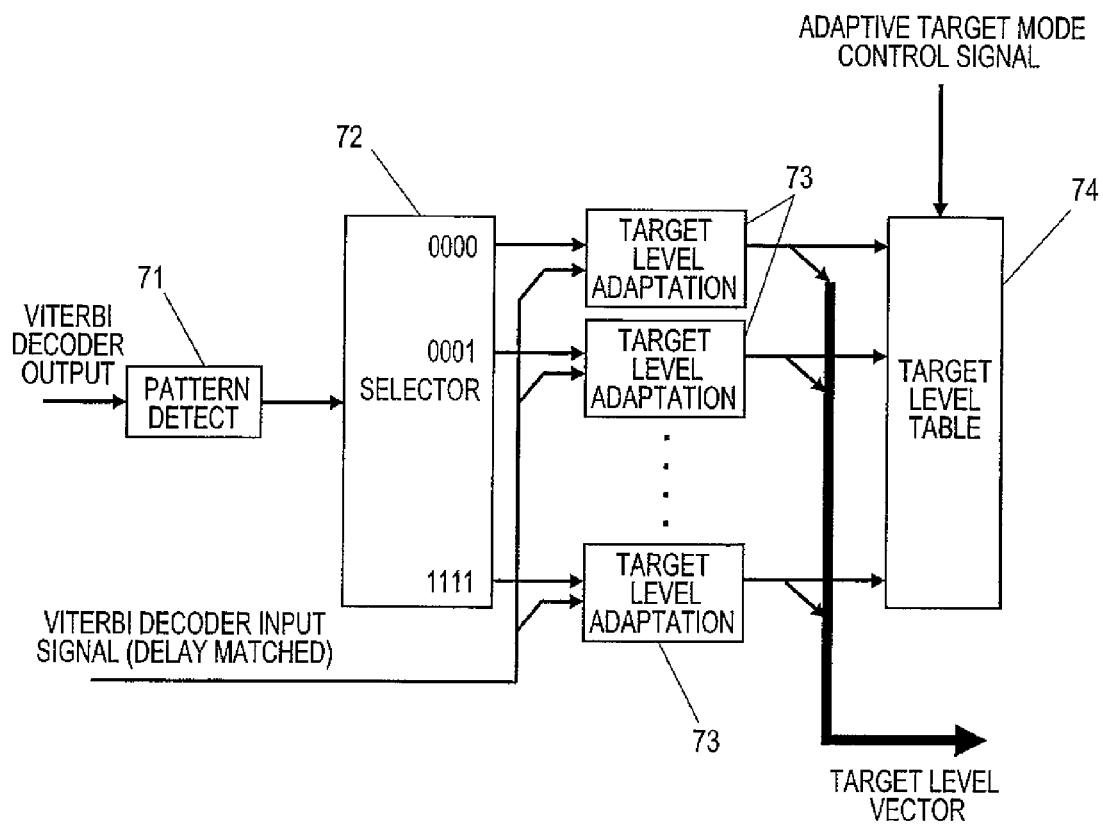
FIG. 12 is a diagram showing the target level measurement method.

Different methods vary according to the size and characteristic to be detected so optical disk devices often utilize multiple detection methods. One type is detection outside the digital signal processing LSI, for example, a typical type utilizes a circuit for detecting abnormalities in the envelope of the read signal in the analog IC mounted in a prestage of the digital signal processing LSI. Defects can also be detected from the sync detection state even with blocks for decoding the 1-7PP code. The signal processing system of the present invention includes a means for detecting signal abnormalities using an observation means, etc. Namely, the amplitude of the input signal is observed via the ADC (analog-to-digital converter), and a defect is judged if the amplitude falls below a preset amplitude for a specified (pre-established) time period. Means are also provided for detecting abnormalities in a signal by monitoring the target level or the target level values of the Viterbi decoder. FIG. 12 is a drawing showing the structure of target level adaptation and the observation system within the Viterbi decoder. The output of the Viterbi decoder is input to the pattern detector 71, and which bit stream each channel lock belongs to is determined, and the pattern selector 72 selects a target adaptation unit 73 to monitor or adapt the target level for that bit stream. The level for the input signal (The delay caused by the Viterbi decoder is already adjusted.) for that corresponding time is input to the target adaptation unit that was selected. The target adaptation unit is an integrator containing the time constant nT (n is a natural number). The target level table 74 contains the target level used during Viterbi decoding and adaptive equalization. When target level adaptation is selected, the output from the target adaptation unit is accepted for rewriting each target level. The output of the target adaptation unit can also be referred to regardless of whether there is a target adaptation instruction or not. It is judged to be defective when the mutual periods of the target level have become smaller than the value that was set, or when the absolute value of each target level has deviated from the range that was set, or when the target level relation is abnormal.

Optical disks such as the Blu-ray disc assume that defects will cause data loss and therefore contain powerful error correction systems. If the error length is within the capacity of the error correction system, read errors (ECC decoding failed) will not occur. In other words, the data loss period must be kept as small as possible in order to avoid read errors, however the bit error rate will become extremely high in the period between the PLL unlocking due to the defect and reaching a lock state again. That is, it equivalently extends the duration of the defect. So in order to avoid the read errors that occur due to defects, it is essential that the PLL lock be restored as quickly as possible after it was unlocked. Also, if the equalization adapter or the target is in an adaptation (or follow-up) state, then the error signal caused by the defect might be mistakenly learned as a wrong tap coefficient or wrong target value, so these operations must be placed on hold in as early a stage as is possible.

Figure 13:
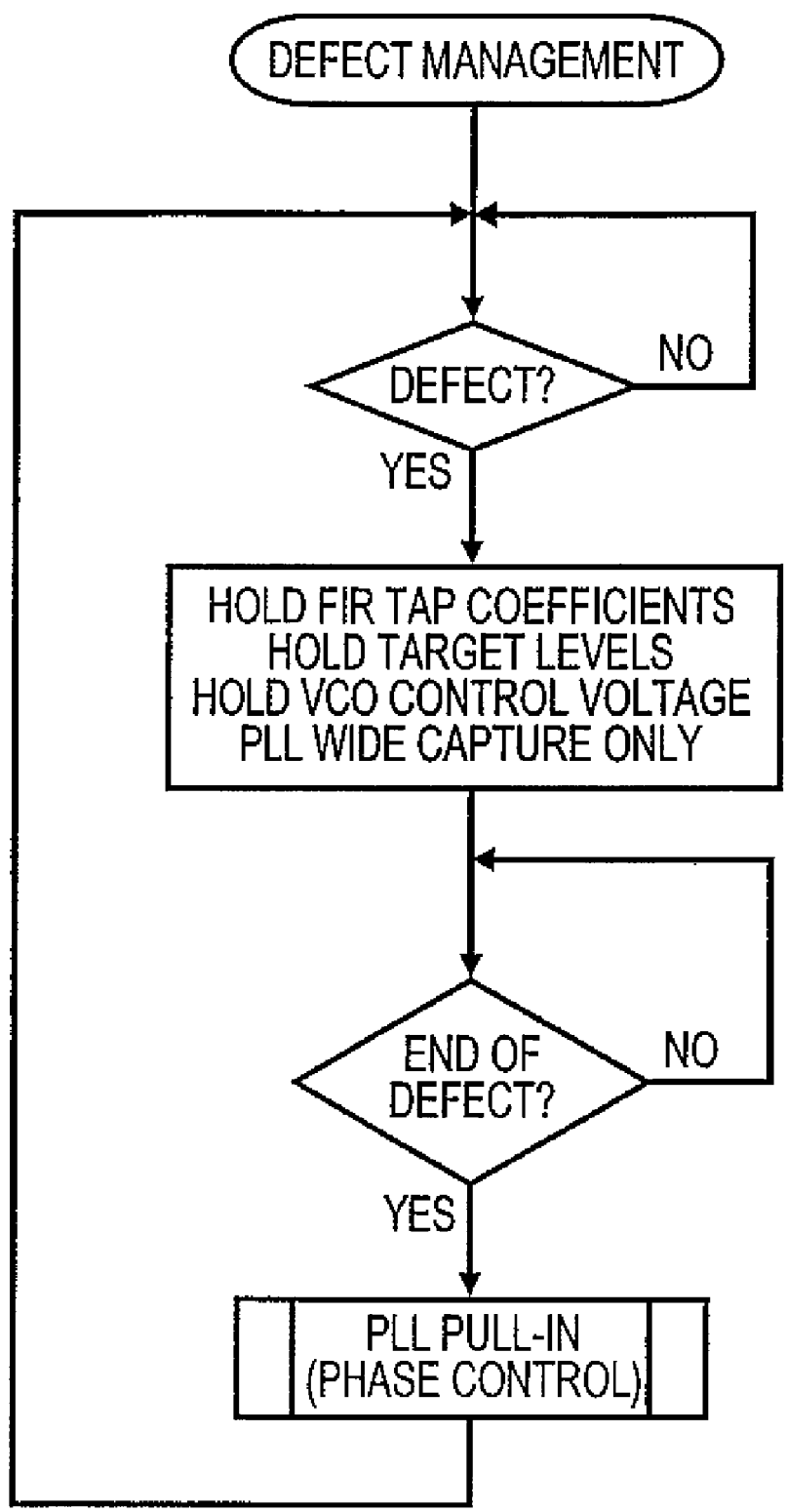
FIG. 13 is a flowchart showing the defect management sequence.

A defect processing sequence is shown in FIG. 13. The defect monitoring is performed outside the LSI or another block within the LSI as previously described, and then the sequence constantly performed by monitoring the respective defect report signals within the read system. Objects for monitoring can be selected from among the defect report signals. The following process is performed if even one defect was reported among the selected defect report signals. Namely, values for the hold for the VCO control voltage, the hold for the FIR equalizer tap coefficient, the hold for the target level of the Viterbi decoder, and the cut-off frequency for the high-pass filter are preset for the link processing. Hold instructions for each parameter issued here are issued separately from hold instructions specified individually such as with a register. In other words, learning is stopped if learning is in progress prior to the hold instruction, and learning automatically restarts after this (hold instruction) is canceled. However if there is no learning prior the hold instruction, then learning is not performed even after this hold instruction is canceled. A precondition for the PLL of course is that the lock will be unlocked so that pull-in operation (process described in the second embodiment and the third embodiment) is first performed regardless of the immediately prior to operating state. Namely, only wide capture is enabled until all defect report signals have been canceled, and by placing the VCO control voltage on hold, a shift to phase control can be prevented. After all defect report signals have been canceled, the pull-in with the PLL in the sequence described in the second and third embodiments is performed. When the PLL lock monitor shows a lock state, the target level hold instruction for the Viterbi decoder and the FIR tap coefficient is canceled.

Ninth Embodiment

Ignoring 2 T

Figure 14:
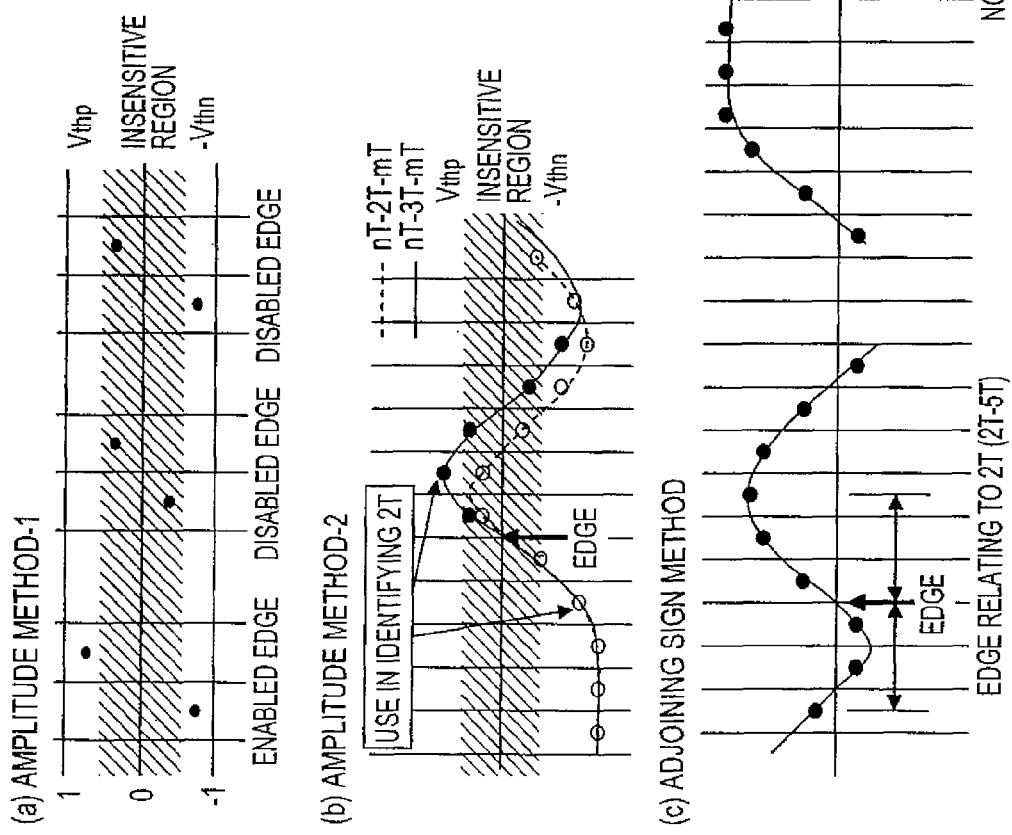
FIG. 14A is a diagram showing the Amplitude method-1 (the 2 T edge exclusion method)
FIG. 14B is a diagram showing the Amplitude method-2 (the 2 T edge exclusion method)
FIG. 14C is a diagram showing the Adjoining sign method-1 (the 2 T edge exclusion method)

On Blu-ray discs, the jitter from the clock recovered by the PLL can be reduced by excluding, as objects for phase detection, those edges relating to 2 T-length marks and spaces. FIGS. 14A to 14C show diagrams illustrating methods for identifying the 2 T edge. The structure of the present invention permits selecting the three methods shown in FIGS. 14A to 14C. The following description and FIGS. 14A to 14C describe the phase detector for the dual time type method. In the dual time type method, an edge is identified by the fact that the signs of the consecutive dual time samples are different. The amplitude method-1 identifies 2 T edges by comparing the threshold of two samples including an edge. In other words, if the absolute value of one of either of the samples is smaller than the threshold, then that edge is identified as a 2 T mark or an edge in contact with a space. The advantage of this method is that it can be easily added to conventional phase detectors A, moreover adding this method does not induce a delay. In contrast to amplitude method-1 that utilizes two samples including an edge, the amplitude method-2 utilizes two samples before and after the two samples including the edge as shown in FIG. 14B. The difference in amplitude at the sample points for 2 T edges and all other edges are small. Therefore, errors during identification with amplitude method-1 increase when there is much noise. The amplitude method-2, on the other hand, has the advantage that the possibility of such error is smaller since there is a large difference in amplitude at the edge identification point between the 2 T edge and all other edges. The adjoining sign method utilizes the fact that n consecutive samples with the same sign can be found in nT mark or space signals. In other words, a total of six sample signs are monitored from three sample signs enclosing the edge from the front and three sample signs enclosing the edge from the rear. If the three samples preceding the edge all possess the same sign, and if the three samples following the edge are the same sign, then the sign is identified as not being a 2 T edge. An advantage of this method is that there is no need to set a threshold. The identification causes a 2 T delay.

FIG. 14(a), which shows amplitude method 1, establishes an insensitive region, and if either of the edges is within that insensitive region, then it is seen as a 2 T edge and disabled. FIG. 14(b), which shows amplitude method 2, is a method which avoids the identification errors (mistaking 3 T edge for 2 T) that tend to occur in amplitude method 1 by identifying 2 T using sample points that are 1 T to the front and rear of the edge. FIG. 14(c), which shows an adjoining sign method, when using a 2 O'clock phase comparator, the fact that the signs for X number of consecutive samples are the same is utilized in the NT signal. In other words, the signs of the 3 O'clock sample values enclosing the edge from front and rear are found, and if each of the signs are 3 o'clock, consecutive, and the same sign, then these edges are judged as not relating to 2 T.

Figure 15:
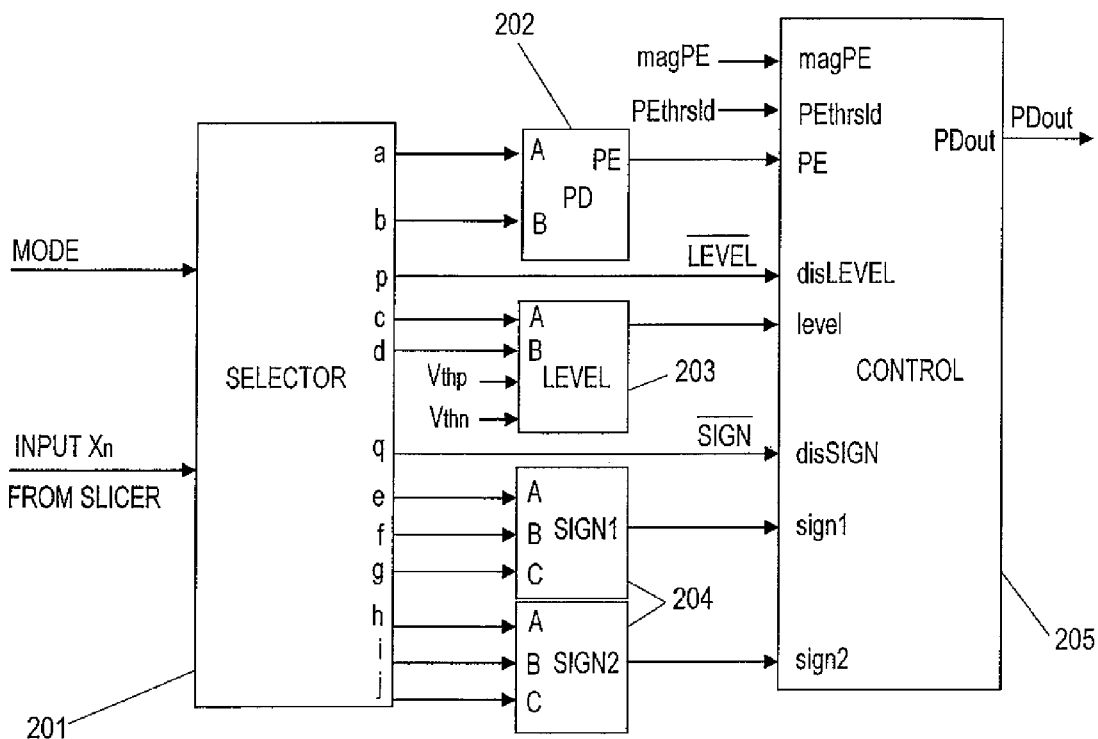
FIG. 15 is a diagram showing the structure of the 2 T edge exclusion phase detector.

FIG. 15 is a diagram of a phase detector implementing the above method. A discrete input signal X(n) is input to the selector 201. The selector contains five delay devices connected in series. The selector structure is configured to output (the outputs) X(n) to X(n−5) to each port according to the operating mode of the phase detector when X(n) is inputted. The selector also outputs a control signal to the output controller according to the operating mode of the phase detector. The output settings for each phase detector operating mode are shown in Table 1.

TABLE 1

| | | PD | | Level | | Sign 1 | | | | Sign 2 | | Control | |
|---|---|---|---|---|---|---|---|---|---|---|---|---|---|
| Signal name | mode | a | b | c | d | e | f | g | h | i | j | p | q |
| Conventional method | 0 | $X_n$ | $X_{n-1}$ | — | — | — | — | — | — | — | — | 1 | 1 |
| Amplitude-1 | 1 | $X_n$ | $X_{n-1}$ | $X_n$ | $X_{n-1}$ | — | — | — | — | — | — | 0 | 1 |
| Amplitude-2 | 2 | $X_{n-1}$ | $X_{n-2}$ | $X_n$ | $X_{n-3}$ | — | — | — | — | — | — | 0 | 1 |
| Adjoining sign | 3 | $X_{n-2}$ | $X_{n-3}$ | — | — | $X_n$ | $X_{n-1}$ | $X_{n-2}$ | $X_{n-3}$ | $X_{n-4}$ | $X_{n-5}$ | 1 | 0 |
| Amplitude-1 + adjoining sign | 4 | $X_{n-2}$ | $X_{n-3}$ | $X_{n-2}$ | $X_{n-3}$ | $X_n$ | $X_{n-1}$ | $X_{n-2}$ | $X_{n-3}$ | $X_{n-4}$ | $X_{n-5}$ | 0 | 0 |
| Amplitude-2 + adjoining sign | 5 | $X_{n-2}$ | $X_{n-3}$ | $X_{n-1}$ | $X_{n-4}$ | $X_n$ | $X_{n-1}$ | $X_{n-2}$ | $X_{n-3}$ | $X_{n-4}$ | $X_{n-5}$ | 0 | 0 |

Figure 16:
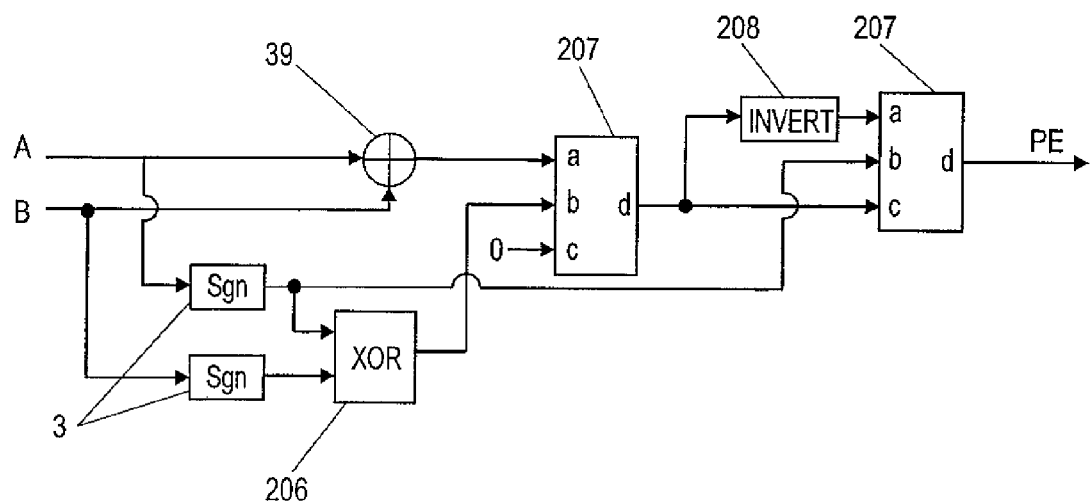
FIG. 16 is a diagram showing the structure of the primitive phase detector.

Besides the above operating modes, settings that do not exclude 2 T edges and modes that combine the adjoining sign method with each amplitude method are also possible. The primitive phase detector 202 is a phase detector using the conventional dual time type method, and outputs a phase error (differential) when the signs of the two samples that were input are mutually different. The structure of that phase detector is shown in FIG. 16. The sign comparator 3 identifies the respective signs of the two samples that were input. If a positive sign, the sign comparator outputs 1, and if negative, outputs 0. The exclusive- or sum of these outputs is input to the exclusive- or unit 206, and the output from 206 is input to the port b of the output selector 207. That output selector outputs the port a input value from port d if the port b input is 0.5 or more and if the port b input value is less than 0.5, it outputs the port c input value from d. The input value A sign to the primitive phase detector is input to port b of the output selector final stage. The outputs of the prestage output selectors are respectively input to the port c of that same output selector (207), and the output of the prestage output selectors is input via the inverter 208 to the port a. The output of the primitive phase detector is input to the PE port of the output controller 205.

Figure 17:
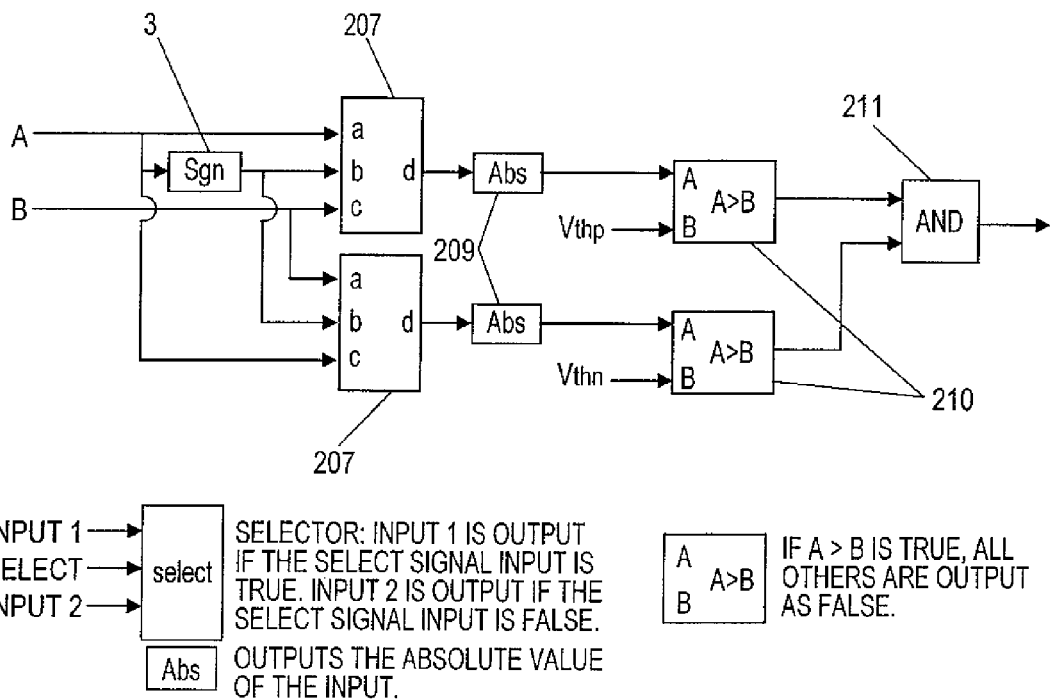
FIG. 17 is a diagram showing the structure of the amplitude comparator.

The amplitude comparator 203 utilizes the Amplitude-1 and 2 methods, and compares the 2 T identification sample values with the thresholds. The structure of the amplitude comparator is shown in FIG. 17. In this embodiment, the thresholds can be independently set to the plus side or the minus side. The two input values to the amplitude comparator are respectively input to the port a and the port b of the two output selectors. However, when the amplitude comparator input A is input to the port a of one of the output selectors, then the amplitude comparator input B is input to the port a of the other output selector 207. The sign identification results for amplitude comparator input A are input to the port b of each output selector. After the output of each output selector are input to the respective absoluters 209 and made into absolute values, these are input to the port A of the comparator 210. The absolute value of the threshold on the plus side or the minus side input to the port B of the comparator. The comparator compares the port A input with the port B input, and if the port A input is larger than the port B input outputs 1, if smaller than the port B input it outputs 0. The sum of the two comparator outputs are inputted to the logical AND unit 211. 1 is therefore obtained as the output of the amplitude comparator only when judged not to be a 2 T edge.

Figure 18:
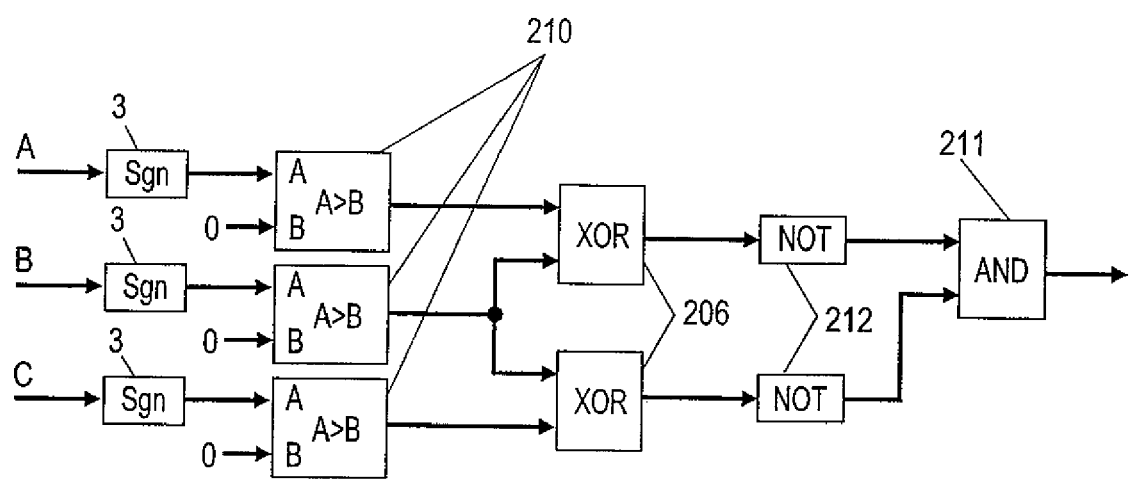
FIG. 18 is a diagram showing the structure of the adjoining sign comparator.

Three samples preceding the respective edge, and the three samples subsequent to the edge are respectively input to the two adjoining sign comparators 204. The structure of the adjoining sign comparators is shown in FIG. 18. The signs of the input samples are acquired using the sign comparator and the comparator and if positive, 1 is set and if negative, 0 is set. One of the comparator outputs is jointly used and the remaining two outputs and the respective exclusive- or logic (output) is acquired, and the logic sum acquired after passing the respective outputs via a NOT unit 212. Here, 1 is output as a result only in the case that the inputs of the adjoining sign comparators are all the same sign.

Figure 19:
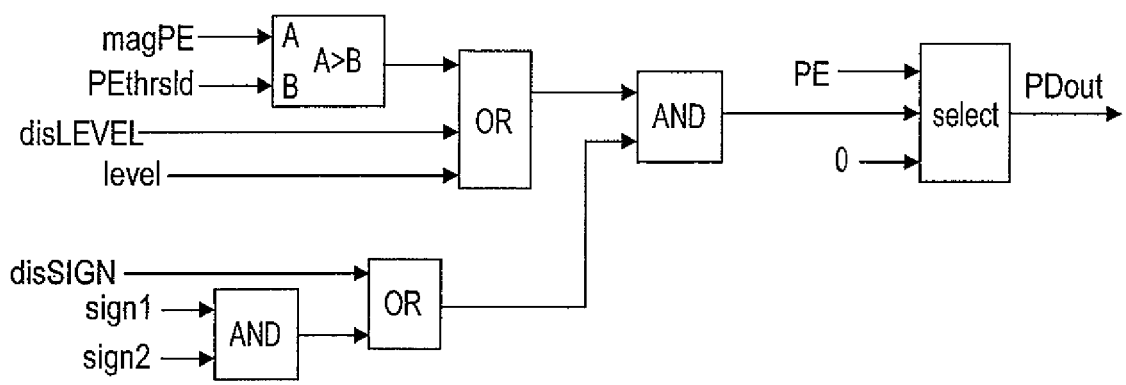
FIG. 19 is a diagram showing the structure of the output controller.

The output controller accepts the above logic outputs and decides whether to output the primitive phase detector output or not. That structure is shown in FIG. 19.

The dual time type method for phase detectors was described above for the ninth embodiment using FIGS. 14A to 14C. However, among methods for excluding the edge related to the 2 T mark and space, the amplitude method can easily be applied even to phase detector equipment using the triple time type method.

Figure 20:
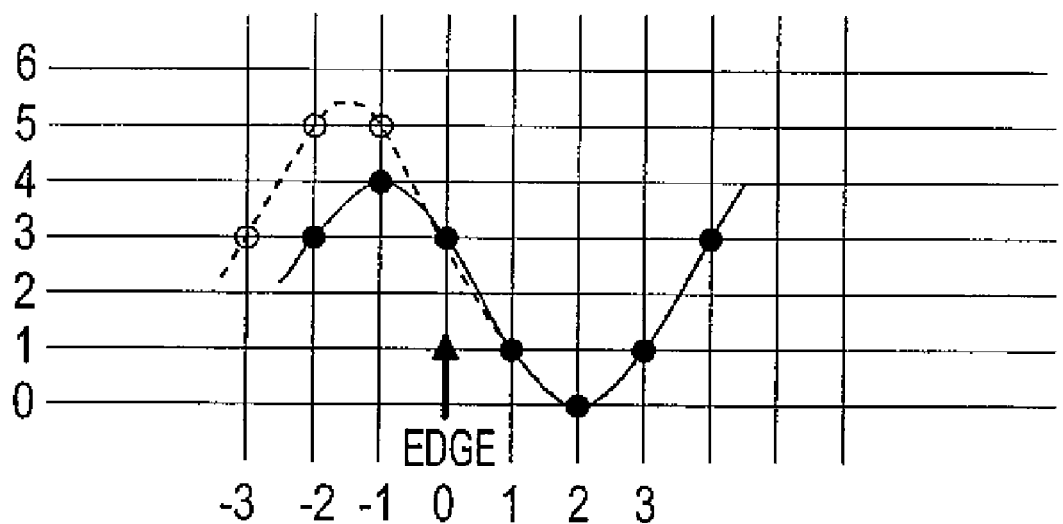
FIG. 20 is a graph of triple time type phase comparison.

In phase detectors using the tri-time type method, the clock points match the data points as shown in FIG. 20. Therefore, the point crossing the 0 level is theoretically the edge. Strictly speaking however, the edge is not 0 level but a value near 0. The read signal maximum or minimum which is derived from the 2 T mark or the space, is the point one clock prior and subsequent to the edge as can be seen in FIG. 20. Here it can be easily seen that the edge relating to the 2 T mark or space is identified by comparing these points with the thresholds.

Tenth Embodiment

Switching to 2 T Ignore Detection

On Blu-ray discs, the jitter from the clock recovered by the PLL can be reduced by excluding, as objects for phase detection, those edges relating to the 2 T mark and space. However, eliminating the edges relating to the 2 T mark and space from phase detection objects of course lowers the appearance frequency of the edge so that the PLL gain drops by an equivalent amount and in a state where the phase error (differential) is large as in the pull-in process, items other than the 2 T edge might be mistakenly excluded. In order to resolve this problem, the channel sequencer contains an internal sequence to automatically switch the phase detector operation according to the state.

Figure 21:
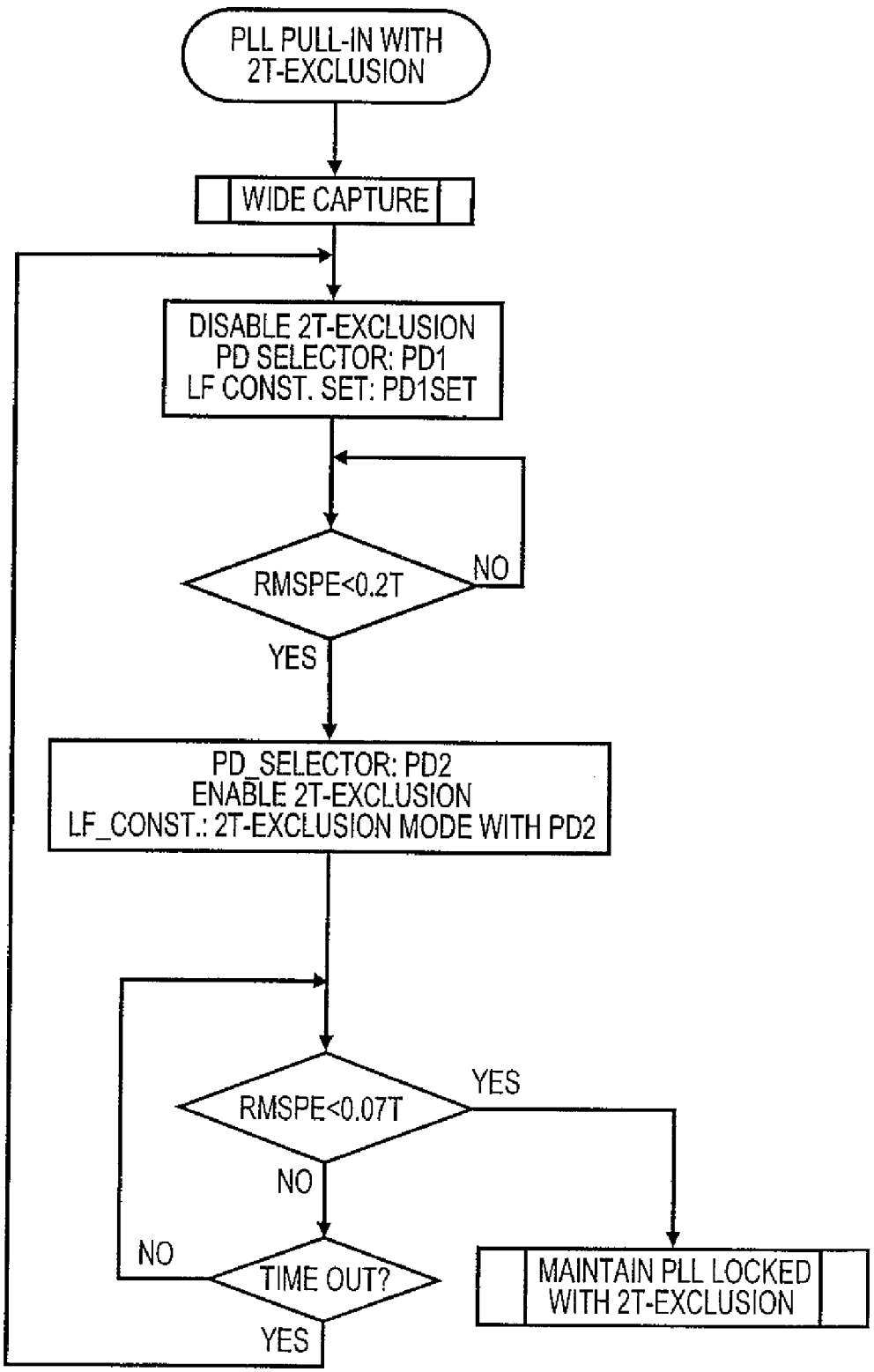
FIG. 21 is a flowchart showing the pull-in sequence during use of 2 T edge exclusion.

As described above, there is a high probability that the 2 T-edge exclusion function used in states where there is a large phase error, might mistakenly exclude items other than the 2 T edge. Therefore a procedure must be used to enable 2 T-edge exclusion after first confirming that the phase error is sufficiently small for performing 2 T exclusion. Moreover, whether or not to use a mode for 2 T edge exclusion as well as a 2 T-edge exclusion function must be set beforehand. The flowchart for a sequence incorporating these measures is shown in FIG. 21.

The basic procedure is approximately the same as in the second embodiment. After wide capture, however, the RMSPE threshold when shifting from the pull-in process using phase detector A to the pull-in process using phase detector B and an equalizer, is a larger value than in the second embodiment, moreover the value is sufficiently small for performing 2 T exclusion. At this time, simultaneously with enabling the 2 T-edge exclusion function, the loop gain is changed to a suitable value during 2 T edge exclusion. The following process is identical to that described in the second embodiment.

Figure 22:
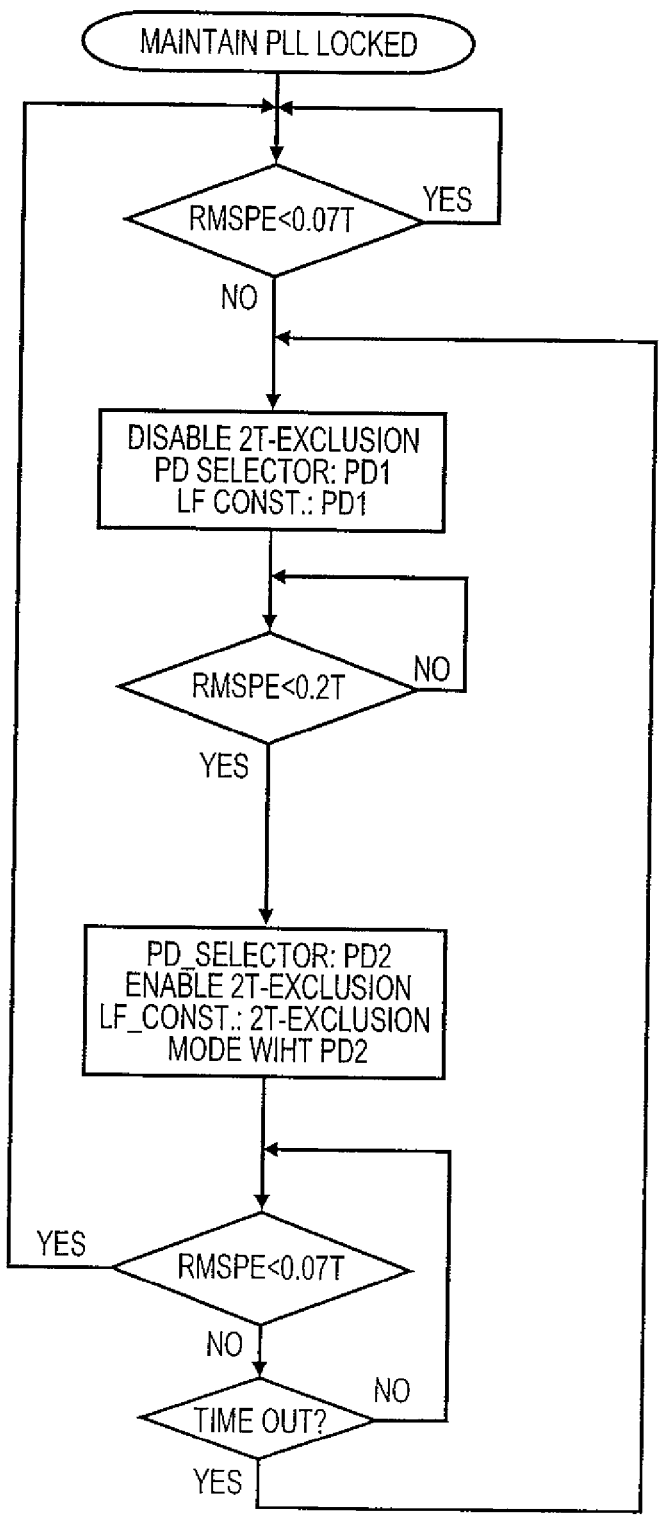
FIG. 22 is a flowchart showing the lock maintenance sequence during use of 2 T edge exclusion.

Sequences for maintaining the lock state must also assume use of the 2 T-edge exclusion function as a precondition. This sequence is shown in FIG. 22. This is nearly the same as when not using the 2 T-edge exclusion function shown in the third embodiment but differs in control of the 2 T-edge exclusion function, and the point for controlling the loop gain for that function, as well as the RSMPE threshold during pull-in using the phase detector A.

Eleventh Embodiment

Cycle Slip

In decoding systems utilizing PLL technology, an error burst occurs spanning a length nearing the path memory length of the Viterbi decoder, when cycle slip occurs in the PLL during decoding. Though PLL operating errors or abnormalities occur in an extremely short time, their effect extends from several dozens to about 100 T. In optical disk systems the occurrence of the error burst itself is predicted and so the error correction system can save the system. However when a cycle slip occurred in the middle of adaptive operation by the adaptive FIR equalizer or adaptation target, then trouble is not limited to the decoding results causing error bursts, and during learning, the target levels and tap coefficients acquire abnormal values whose effects propagate over a very long time.

Figure 23:
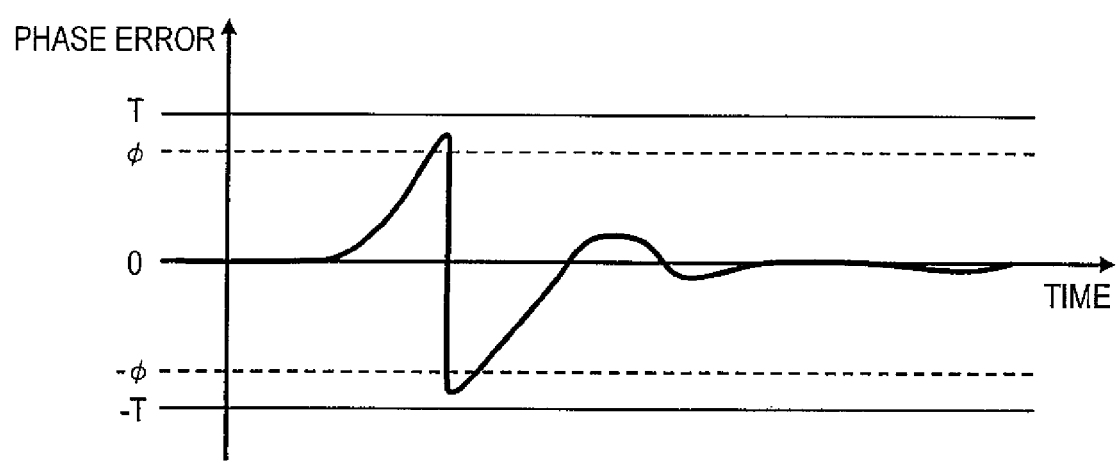
FIG. 23 is a graph showing cycle slip.
Figure 24:
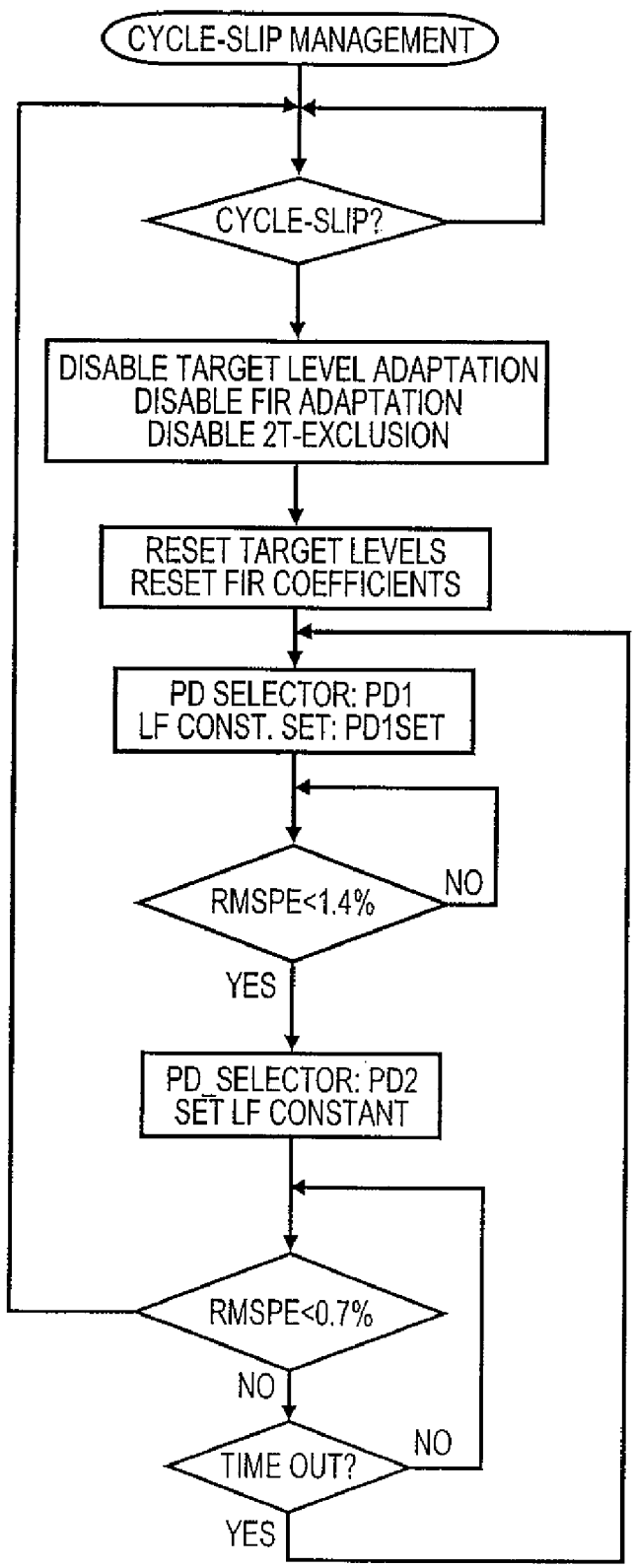
FIG. 24 is a flowchart showing the sequence after cycle slip detection.

One means for avoiding this type of abnormal operation is detecting the cycle slip of the PLL. A description of that method is shown in FIG. 24. As shown in FIG. 23, cycle slip is a phenomenon where the phase of the clock and the input signal deviate by one period or more due to phase error exceeding ±T for some reason. In FIG. 23, phase recovery is performed so that the phase error becomes −T in the next moment right after the phase error exceeds T. Further, the linearity of the phase error detection cannot be maintained during actual operation in dual time type phase detectors in areas where there is a large phase error (differential), so this phenomenon occurs where the size of the phase error (differential) is a value slightly smaller than T as shown in FIG. 23. In any case, the cycle slip can be detected by monitoring the phase error. In other words, by specifying a sufficiently large $\phi$ threshold, a cycle slip is judged to have occurred when the phase error becomes large and exceeds this threshold and moreover the opposite sign is larger than $\phi$ and within the specified period. The above description assumes use of a dual time type phase detector, however the same explanation applies in the case of other types of phase detectors.

The sequence performed when a cycle slip has occurred is shown in FIG. 24. The adaptive operation elements made up of the adaptive FIR equalizer and the Viterbi decoder, immediately stop the adaptive operation and return (reset) the tap coefficients of the FIR equalizer and also the target level to the initial values. The operation from this point onwards is basically the same as PLL pull-in operation after wide capture.

Twelfth Embodiment

Optical Disk Device

Figure 25:
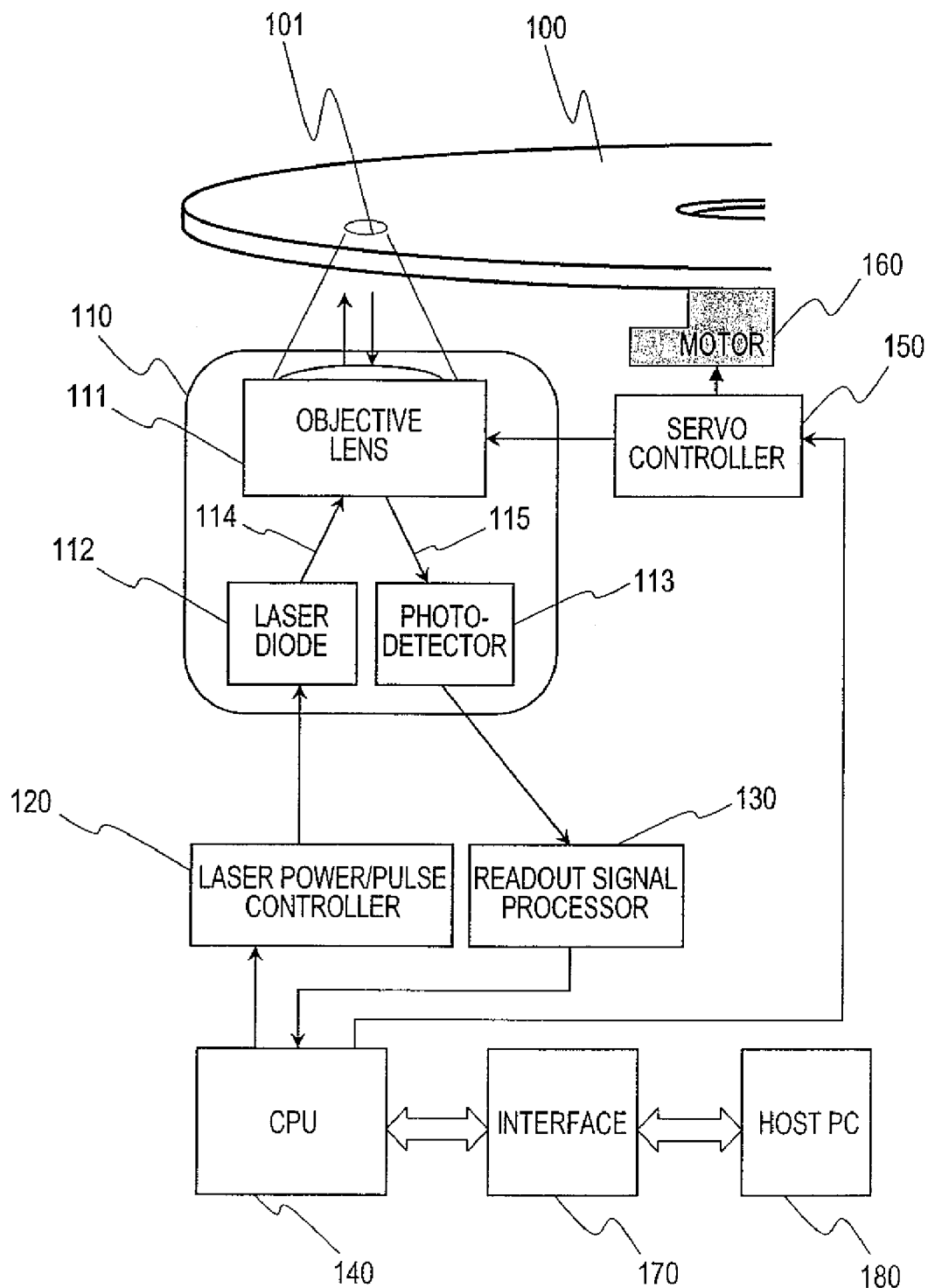
FIG. 25 is a diagram showing an example of the optical disk device of the present invention.

FIG. 25 is a drawing showing the structure of the optical disk device of the present invention. An optical disk 100 is rotated by a motor 160. During read, a laser power and pulse controller 120 controls the current flowing to the laser diode 112 within the optical head 110 to attain a light intensity specified by the CPU 140 and generate a laser beam 114. The laser beam 114 forms a light spot 101 focused by the objective lens 111 onto the optical disk medium 100. A photo detector 113 detects reflected light 115 from this optical spot 101 by way of the objective lens 111. This optical detector is made up of multiple photo detector elements. The read signal processor 130 reads the information recorded on the optical disk (medium) 100 by utilizing the signal detected by the optical head 110. During read, the laser power and pulse controller 120 converts the specified recording data into a specified write pulse current, and controls the pulsed light emitted from the semiconductor laser 112. A read signal processor circuit 130 shown in FIG. 1 contains an internal demodulation circuit for the read signal of the present invention. This structure achieves an optical disk device utilizing the PRML method.

Thirteenth Embodiment

Figure 3:
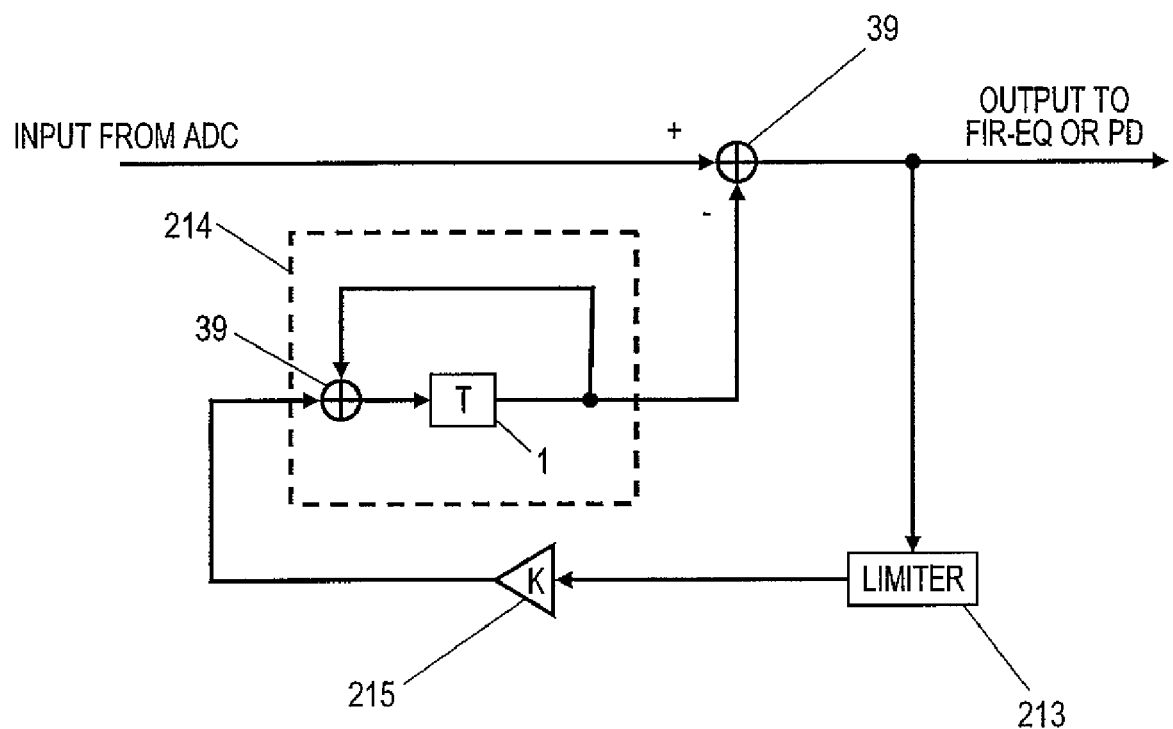
FIG. 3 is a drawing showing the structure of the slicer.

An example where one section of the embodiment shown in FIG. 1 is changed is described next. The slicer performs the task of alleviating (reducing) the offset that occurs when an asymmetrical signal is input. The slicer may for example possess the structure shown in FIG. 3. The limiter 213 limits a signal whose amplitude size exceeded a preset threshold, to within a maximum amplitude threshold. The optical disk system is designed so that marks and spaces will have the same frequency of appearance, so that the filter output will be 0 when there is no offset in the slicer output, and the limiter output is passed through an IIR (infinite impulse response) filter. When there is an offset in the slicer output, the IIR filter 214 output applies a limited value by the integration effect to apply feedback to reduce that output from the input signal. Therefore that output is in this way removed from the slicer output. The above description summarizes the slicer operation.

Removal of offsets by the slicer is of course incomplete and so residual offsets remain. The resolution in CD and DVD is 50 percent or more so that the residual offset can be ignored. However, in Blu-ray discs the 2 T signal resolution is approximately 25 percent in the standard state and may drop below 10 percent. The relative effect of the residual offset therefore becomes large to an extent where it cannot be ignored. This residual offset is also reflected in the observation results and the adaptation of the Viterbi decoder target level. If the PR class is PR(1,2,2,1), the average value ("0" level) of the target level of the bit patterns (0011) and (1100) is equivalent to the residual offset. The residual offset can therefore be corrected by utilizing this value.

Figure 4:
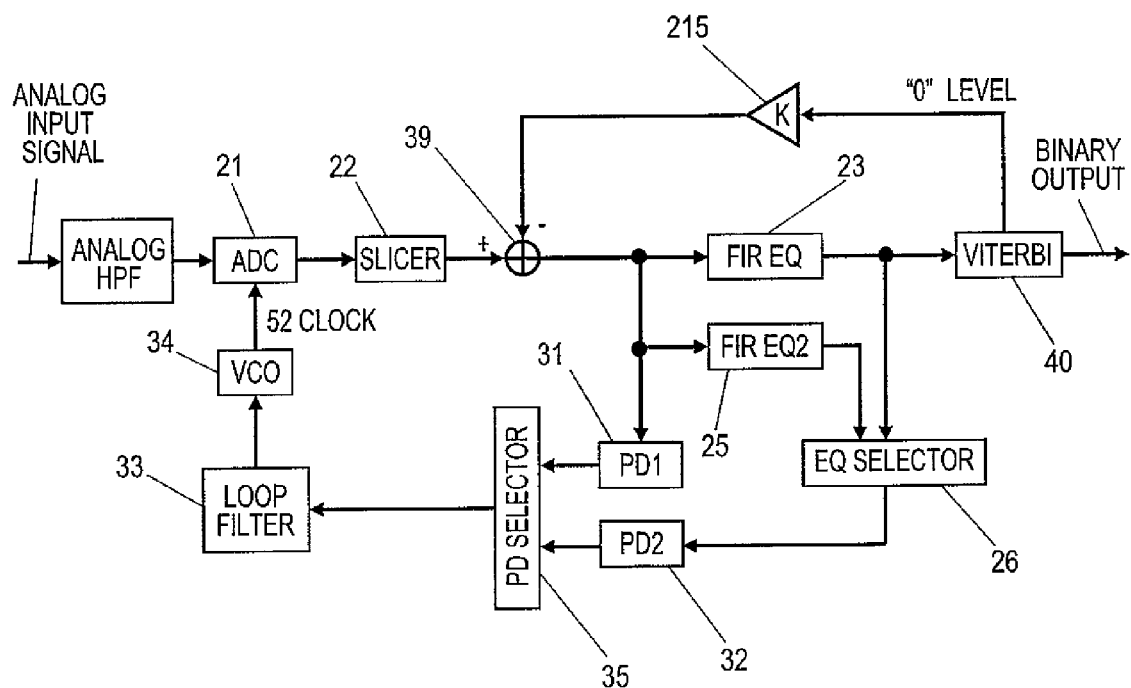
FIG. 4 is a drawing showing the mechanism for residual offset compensation.

The method for correcting the residual offset using the "0" level is shown in FIG. 4. Namely, this correction is achieved by applying a suitable gain with the multiplier 215 to the "0" level value, and applying negative feedback to the output of the slicer.

In the above example, the average value of the target levels for bit patterns (0011) and (1100) is the center of the eye pattern. Among other possibilities, utilizing an average value corresponding to the level of the 2 T signal peak and bottom is also effective.

In the example in FIG. 4, the residual offset is suppressed by the feedback control method. However, the operation of the overall read system involves multiple feedback loops such as PLL, the adaptive equalizer, the adaptive Viterbi decoder and these feedback loops might interfere with one another. Besides making the time constant of the target level feedback system sufficiently larger than the other systems (circuits), another effective method for eliminating this phenomenon is the quasi-static method that monitors the size of the residual offset with firmware and applies corrections to the slicer output when judged that correction is required. In this case, a value calculated from the target level and divided by the DC gain of the FIR equalizer should be utilized as the correction value to apply.

The present invention is mainly utilized in optical disk devices.

What is claimed is:

1. An information read device equipped with means for obtaining a data pattern recorded on an information recording medium as a readout signal, comprising:
    an analog to digital converter for converting the readout signal to a digital signal for a predetermined clock;
    a phase locked loop circuit that supplies the predetermined clock used in the analog to digital converter;
    a first FIR filter for equalizing the digital-converted digital signal under a first equalization condition;
    a Viterbi decoder to decode outputs of the FIR filter into binary data;
    wherein the phase locked loop circuit enables detection of a cycle slip of the phase locked loop circuit; and
    means for detecting the cycle slip of the phase locked loop circuit;
    wherein the FIR filter returns tap coefficients of the FIR filter, and the Viterbi decoder returns a target level of a decode operation to an initial value when an out-breaking of the cycle slip occurs.

2. An information read device equipped with means for obtaining the data pattern recorded on a information recording medium as a readout signal, comprising:
    an analog to digital converter for converting the readout signal to a digital signal for a predetermined clock;
    a phase locked loop circuit that supplies the predetermined clock used in the analog to digital converter;
    a first FIR filter for equalizing the digital-converted digital signal under a first equalization condition;
    a Viterbi decoder to decode outputs of the FIR filter into binary data;
    wherein the phase locked loop circuit enables detection of a cycle slip of the phase locked loop circuit;
    a slicer for reducing an offset between the analog to digital converter and a first equalizer or a second equalizer; and
    a feedback circuit for applying a specified gain to an average value of a target level of the Viterbi decoder, for feedback to an output of the slicer.

* * * * *